(12) United States Patent
Wang

(10) Patent No.: US 9,842,428 B2
(45) Date of Patent: Dec. 12, 2017

(54) DYNAMICALLY OPTIMIZED DEFERRED RENDERING PIPELINE

(71) Applicant: SAMSUNG ELECTRONICS COMPANY, LTD., Suwon, Gyeonggi-do (KR)

(72) Inventor: Zhenghong Wang, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 220 days.

(21) Appl. No.: 14/679,720

(22) Filed: Apr. 6, 2015

(65) Prior Publication Data

US 2015/0379672 A1    Dec. 31, 2015

Related U.S. Application Data

(60) Provisional application No. 62/018,309, filed on Jun. 27, 2014.

(51) Int. Cl.
    *G09G 5/00*      (2006.01)
    *G06T 15/80*      (2011.01)
    (Continued)

(52) U.S. Cl.
    CPC .......... *G06T 15/80* (2013.01); *G06F 9/45525* (2013.01); *G06T 15/005* (2013.01)

(58) Field of Classification Search
    CPC .... G06T 15/80; G06T 15/005; G06F 9/45525
    See application file for complete search history.

(56) References Cited

U.S. PATENT DOCUMENTS

5,977,977 A * 11/1999 Kajiya ................ G06T 11/001
                                                                                  345/418
6,252,608 B1    6/2001 Snyder et al.
(Continued)

FOREIGN PATENT DOCUMENTS

CN     102096897 B    5/2015
WO    2014085004 A1    6/2015

OTHER PUBLICATIONS

Pool, J., "Energy-Precision Tradeoffs in the Graphics Pipeline", Chapel Hill, 2012, pp. 1-158, University of North Carolina, United States.

(Continued)

*Primary Examiner* — Devona E Faulk
*Assistant Examiner* — Charles L Beard
(74) *Attorney, Agent, or Firm* — Innovation Counsel LLP

(57) ABSTRACT

A method for dynamically configuring a graphics pipeline system. The method includes determining an optimal pipeline based on: estimating one or more of memory power consumption and computation power consumption of storing and regenerating intermediate results based on graphics state information and one or more factors; determining granularity for the optimal graphics pipeline configuration based on the graphics state information and the one or more factors; collecting runtime information for primitives from graphics pipeline hardware including factors from tessellation or using graphics state information for determining geometry expansion at an output of one or more shader stages; and determining intermediate results to save from a previous processing pass by comparing memory power consumption needed to save the intermediate results with computation power as well as memory power needed for regenerating the intermediate results in one or more later tile rendering passes.

30 Claims, 18 Drawing Sheets

(51) Int. Cl.
*G06T 15/00* (2011.01)
*G06F 9/455* (2006.01)

(56) References Cited

U.S. PATENT DOCUMENTS

| | | | |
|---|---|---|---|
| 6,504,542 B1 | 1/2003 | Voorhies et al. | |
| 6,697,063 B1 | 2/2004 | Zhu | |
| 6,867,781 B1 | 3/2005 | Van Hook et al. | |
| 6,989,835 B2* | 1/2006 | Deering | G06T 15/005 345/502 |
| 7,109,987 B2 | 9/2006 | Goel et al. | |
| 7,170,515 B1* | 1/2007 | Zhu | G06T 15/005 345/422 |
| 7,184,059 B1 | 2/2007 | Fouladi et al. | |
| 7,190,366 B2* | 3/2007 | Hutchins | G06T 15/005 345/505 |
| 7,391,418 B2* | 6/2008 | Pulli | G06T 15/40 345/421 |
| 7,508,390 B1 | 3/2009 | Demers | |
| 7,554,538 B2 | 6/2009 | Wexler et al. | |
| 7,623,132 B1* | 11/2009 | Bastos | G06T 15/005 345/506 |
| 7,928,989 B1* | 4/2011 | Brown | G06T 15/04 345/501 |
| 8,044,971 B2* | 10/2011 | Nystad | G06T 11/40 345/589 |
| 8,115,767 B2 | 2/2012 | Stich | |
| 8,144,156 B1 | 3/2012 | Baldwin | |
| 8,254,455 B2 | 8/2012 | Wu et al. | |
| 8,384,736 B1 | 2/2013 | Lindholm et al. | |
| 8,427,487 B1* | 4/2013 | Crow | G06T 11/40 345/501 |
| 8,446,409 B2* | 5/2013 | Howson | G06T 15/40 345/419 |
| 8,448,067 B2 | 5/2013 | Cerny et al. | |
| 8,595,425 B2 | 11/2013 | Minkin et al. | |
| 8,619,085 B2* | 12/2013 | Keall | G06T 11/20 345/418 |
| 8,704,826 B1* | 4/2014 | Hakura | G06T 15/005 345/419 |
| 8,749,562 B1* | 6/2014 | Duluk, Jr. | G06F 13/1636 345/522 |
| 8,849,687 B2* | 9/2014 | Hakim | B60L 11/1824 705/7.13 |
| 8,984,230 B2* | 3/2015 | Kocberber | G06F 12/0897 711/134 |
| 9,299,123 B2* | 3/2016 | Goel | G06T 1/20 |
| 9,317,948 B2* | 4/2016 | Tapply | G06T 11/40 |
| 9,502,137 B2* | 11/2016 | Corbett | G06F 11/1068 |
| 9,607,577 B2* | 3/2017 | Hajjar | G09G 5/10 |
| 2003/0137528 A1 | 7/2003 | Wasserman | G06F 3/1431 715/700 |
| 2005/0243094 A1* | 11/2005 | Patel | G06T 15/005 345/506 |
| 2006/0071933 A1* | 4/2006 | Green | G06T 15/50 345/426 |
| 2006/0267981 A1* | 11/2006 | Naoi | G06T 15/005 345/426 |
| 2007/0165035 A1* | 7/2007 | Duluk | G06T 1/60 345/506 |
| 2008/0018664 A1* | 1/2008 | Min | G06T 15/00 345/622 |
| 2008/0025388 A1* | 1/2008 | Kim | H04N 19/159 375/240.01 |
| 2008/0192874 A1* | 8/2008 | Lim | H04L 27/2676 375/359 |
| 2009/0083497 A1* | 3/2009 | Yu | G06F 12/0842 711/144 |
| 2009/0109219 A1* | 4/2009 | DeCoro | G06T 17/205 345/423 |
| 2009/0122068 A1* | 5/2009 | Garritsen | G09G 3/003 345/522 |
| 2009/0135180 A1* | 5/2009 | Li | G06T 15/08 345/420 |
| 2009/0189909 A1* | 7/2009 | Jiao | G06T 1/60 345/506 |
| 2009/0322768 A1* | 12/2009 | Lalonde | G06F 8/41 345/520 |
| 2010/0060630 A1* | 3/2010 | Nystad | G06T 15/40 345/419 |
| 2010/0166062 A1* | 7/2010 | Perlman | A63F 13/12 375/240.05 |
| 2010/0166063 A1* | 7/2010 | Perlman | A63F 13/71 375/240.07 |
| 2010/0177105 A1* | 7/2010 | Nystad | G06T 11/40 345/522 |
| 2011/0141122 A1* | 6/2011 | Hakura | G06T 1/00 345/505 |
| 2011/0221743 A1* | 9/2011 | Keall | G06T 15/005 345/419 |
| 2011/0234592 A1* | 9/2011 | Patel | G06T 15/005 345/426 |
| 2011/0242113 A1* | 10/2011 | Keall | G06F 9/3857 345/505 |
| 2011/0254852 A1 | 10/2011 | Howson | |
| 2012/0206447 A1* | 8/2012 | Hutchins | G06T 15/005 345/419 |
| 2012/0223947 A1* | 9/2012 | Nystad | G06T 15/005 345/426 |
| 2012/0229464 A1* | 9/2012 | Fishwick | G06T 17/20 345/423 |
| 2012/0281004 A1* | 11/2012 | Shebanow | G09G 5/36 345/557 |
| 2012/0293519 A1* | 11/2012 | Ribble | G06T 15/005 345/501 |
| 2012/0320069 A1* | 12/2012 | Lee | G06F 9/505 345/505 |
| 2013/0016114 A1* | 1/2013 | Rabii | G09G 5/363 345/589 |
| 2013/0021358 A1* | 1/2013 | Nordlund | G06T 1/20 345/581 |
| 2013/0036290 A1* | 2/2013 | Nystad | G06F 12/06 711/201 |
| 2013/0113790 A1* | 5/2013 | Kazakov | G06T 15/005 345/419 |
| 2013/0135341 A1* | 5/2013 | Seetharamaiah | G06T 15/005 345/619 |
| 2013/0147421 A1* | 6/2013 | Shin | H02J 7/007 320/101 |
| 2013/0195352 A1* | 8/2013 | Nystad | H04N 19/197 382/166 |
| 2013/0198485 A1* | 8/2013 | Nystad | G06F 12/0215 711/204 |
| 2013/0241938 A1* | 9/2013 | Gruber | G06T 15/005 345/501 |
| 2013/0265309 A1* | 10/2013 | Goel | G06T 15/80 345/426 |
| 2013/0293544 A1* | 11/2013 | Schreyer | G06T 15/005 345/426 |
| 2014/0063013 A1* | 3/2014 | Goel | G06T 17/20 345/423 |
| 2014/0063014 A1* | 3/2014 | Goel | G06T 1/60 345/423 |
| 2014/0092087 A1* | 4/2014 | Kazama | G06F 9/505 345/420 |
| 2014/0111513 A1* | 4/2014 | Ceylan | G06T 17/20 345/423 |
| 2014/0118379 A1* | 5/2014 | Hakura | G06T 1/60 345/557 |
| 2014/0136793 A1* | 5/2014 | Robertson | G06F 12/0891 711/135 |
| 2014/0139534 A1* | 5/2014 | Tapply | G06T 15/005 345/522 |
| 2014/0146064 A1* | 5/2014 | Seetharamaiah | G06T 1/60 345/531 |
| 2014/0152675 A1* | 6/2014 | Martin | G06T 17/20 345/506 |
| 2014/0181071 A1* | 6/2014 | Pidduck | G06F 17/30117 707/711 |

(56) References Cited

U.S. PATENT DOCUMENTS

| | | | |
|---|---|---|---|
| 2014/0184617 A1* | 7/2014 | Palmer | G06T 1/20 345/506 |
| 2014/0184623 A1* | 7/2014 | Frascati | G06T 1/20 345/522 |
| 2014/0192053 A1* | 7/2014 | Bi | H04N 13/0278 345/426 |
| 2014/0195064 A1* | 7/2014 | Lim | H04L 12/2823 700/298 |
| 2014/0204080 A1* | 7/2014 | Goel | G06T 1/20 345/419 |
| 2014/0210819 A1* | 7/2014 | Mei | G06T 17/20 345/423 |
| 2014/0232729 A1* | 8/2014 | Hakura | G06T 15/005 345/506 |
| 2014/0237165 A1* | 8/2014 | Seo | G06F 12/0246 711/103 |
| 2014/0237187 A1* | 8/2014 | Dimitrov | G06F 12/0897 711/122 |
| 2014/0267259 A1* | 9/2014 | Frascati | G06T 15/005 345/423 |
| 2014/0267319 A1* | 9/2014 | Hakura | G06T 15/005 345/506 |
| 2014/0267320 A1* | 9/2014 | Hakura | G06T 1/20 345/506 |
| 2014/0267377 A1* | 9/2014 | Halstvedt | G06T 11/40 345/613 |
| 2014/0281771 A1* | 9/2014 | Yoon | G06F 11/1068 714/721 |
| 2014/0306971 A1* | 10/2014 | Frascati | G06T 11/40 345/522 |
| 2014/0320512 A1* | 10/2014 | Seetharamaiah | G06T 15/005 345/564 |
| 2014/0354670 A1* | 12/2014 | Heggelund | G06T 11/40 345/589 |
| 2015/0022519 A1* | 1/2015 | Lum | G06T 17/05 345/422 |
| 2015/0054827 A1* | 2/2015 | Hakura | G06T 15/005 345/423 |
| 2015/0067361 A1* | 3/2015 | Rusu | G06F 1/3275 713/320 |
| 2015/0082811 A1* | 3/2015 | Rangarajan | F25B 21/02 62/3.7 |
| 2015/0084952 A1* | 3/2015 | Moreton | G06T 19/00 345/420 |
| 2015/0084975 A1* | 3/2015 | Heinrich | G06T 1/60 345/552 |
| 2015/0089249 A1* | 3/2015 | Hannon | G06F 9/5094 713/300 |
| 2015/0095589 A1* | 4/2015 | Park | G06F 12/122 711/141 |
| 2015/0103252 A1* | 4/2015 | Rane | G09G 5/06 348/675 |
| 2015/0109313 A1* | 4/2015 | Heggelund | G06T 15/005 345/522 |
| 2015/0127912 A1* | 5/2015 | Solihin | G06F 12/08 711/125 |
| 2015/0138197 A1* | 5/2015 | Yu | G06T 15/005 345/420 |
| 2015/0186284 A1* | 7/2015 | Butler | G06F 12/0864 711/128 |
| 2015/0199833 A1* | 7/2015 | Warner | G06T 11/60 345/629 |
| 2015/0213638 A1* | 7/2015 | Dimitrov | G06T 15/005 345/619 |
| 2015/0235341 A1* | 8/2015 | Mei | G06T 1/60 345/426 |
| 2015/0296193 A1* | 10/2015 | Cote | H04N 9/646 382/167 |
| 2015/0302546 A1* | 10/2015 | Balci | G06T 1/20 345/522 |
| 2015/0317763 A1* | 11/2015 | Mather | G06T 15/005 345/506 |
| 2015/0317818 A1* | 11/2015 | Howson | G06T 15/005 345/424 |
| 2015/0324198 A1* | 11/2015 | Alsup | G06F 9/30069 712/233 |
| 2015/0325037 A1 | 11/2015 | Lentz et al. | |
| 2015/0379663 A1* | 12/2015 | Gruber | G06T 1/20 345/522 |
| 2016/0005140 A1* | 1/2016 | Engh-Halstvedt | G06T 15/005 345/506 |
| 2016/0027203 A1* | 1/2016 | Lee | G06T 15/005 345/423 |
| 2016/0042550 A1* | 2/2016 | Li | G06T 15/005 345/426 |
| 2016/0048980 A1* | 2/2016 | Wang | G06T 11/40 345/583 |
| 2016/0055608 A1* | 2/2016 | Frascati | G06T 1/20 345/522 |
| 2016/0086299 A1* | 3/2016 | Sharma | G06T 15/405 345/422 |
| 2016/0086340 A1* | 3/2016 | Woo | G06T 7/0051 345/419 |
| 2016/0110889 A1* | 4/2016 | Shim | G06T 11/001 345/582 |
| 2016/0116973 A1* | 4/2016 | Lee | G06F 1/3287 345/419 |
| 2016/0117855 A1* | 4/2016 | Lee | G06T 15/40 345/421 |
| 2016/0125851 A1* | 5/2016 | Jin | G09G 5/39 345/582 |
| 2016/0140688 A1* | 5/2016 | Lee | G06T 9/00 345/426 |
| 2016/0148335 A1* | 5/2016 | Huang | G06T 1/20 345/501 |
| 2016/0148424 A1* | 5/2016 | Chung | G06L 15/005 345/423 |
| 2016/0148426 A1* | 5/2016 | Son | G06T 15/005 345/423 |
| 2016/0171756 A1* | 6/2016 | Akenine-Moller | G06T 15/005 345/421 |
| 2016/0180488 A1* | 6/2016 | Poddar | G06T 1/60 345/522 |
| 2016/0188491 A1* | 6/2016 | Apodaca | G06F 12/126 711/133 |
| 2016/0232645 A1* | 8/2016 | Wang | G06F 9/50 |
| 2016/0260241 A1* | 9/2016 | Jin | G06T 11/20 |
| 2016/0283391 A1* | 9/2016 | Nilsson | G06F 12/0893 |
| 2016/0307342 A1* | 10/2016 | Lee | G06T 11/203 |
| 2016/0321774 A1* | 11/2016 | Liang | G06T 1/20 |
| 2016/0328879 A1* | 11/2016 | Jin | G06T 15/005 |
| 2017/0061568 A1* | 3/2017 | Metz | G06T 1/20 |
| 2017/0076434 A1* | 3/2017 | Pyo | G06T 5/006 |
| 2017/0091575 A1* | 3/2017 | Lee | G06K 9/42 |
| 2017/0091897 A1* | 3/2017 | Lee | G06T 1/20 |
| 2017/0098294 A1* | 4/2017 | Kim | G06T 15/005 |
| 2017/0125037 A1* | 5/2017 | Shin | G10L 15/02 |
| 2017/0140573 A1* | 5/2017 | Woo | G06T 1/20 |
| 2017/0193628 A1* | 7/2017 | Sharma | G06T 1/0064 |
| 2017/0206163 A1* | 7/2017 | Solihin | G06F 12/0848 |

OTHER PUBLICATIONS

Govindaraju, N.K. et al., "Fast and Reliable Collision Culling using Graphics Hardware", Proceedings of the ACM Symposium on Virtual Reality Software and Technology (VRST'04), Nov. 10-12, 2004, pp. 1-8, ACM, United States.

NVIDIA Corporation, "NVIDIA Tegra 4 Family GPU Architecture", Feb. 2013, pp. 1-26, United States.

Imagination Technologies Ltd., "Powervr Series5 Graphics SGX architecture guide for developers—Tile Based Deferred Rendering (TBDR)", Jul. 5, 2011, p. 8, Version 1.0.8, United Kingdom.

Sugerman, J. et al., "GRAMPS: A Programming Model for Graphics Pipelines", Journal ACM Transactions on Graphics (TOG), Jan. 2009, pp. 1-19, vol. 28, Issue 1, ACM, United States.

Patney, A. et al., "Piko: A Design Framework for Programmable Graphics Pipelines", Jan. 30, 2015, pp. 1-13, Cornell University, United States.

(56) References Cited

OTHER PUBLICATIONS

Merry. B., "Performance Tuning for Tile-Based Architectures", Jul. 23, 2012, pp. 323-355, OpenGL Sights, United States.
Antochi, I., "Suitability of Tile-Based Rendering for Low-Power 3D Graphics Accelerators", Proefschrift, Oct. 29, 2007, pp. 1-163, Universitatea Politehnica Bucuresti, Romania.
U.S. Non-Final Office Action for U.S. Appl. No. 14/530,316 dated Aug. 18, 2016.

* cited by examiner

DYNAMICALLY OPTIMIZED DEFERRED RENDERING PIPELINE

CROSS-REFERENCE TO RELATED APPLICATIONS

This application claims the priority benefit of U.S. Provisional Patent Application Ser. No. 62/018,309, filed Jun. 27, 2014, which is incorporated herein by reference in its entirety.

TECHNICAL FIELD

One or more embodiments generally relate to graphical processing pipelines, in particular, to adaptively and dynamically configuring a graphics pipeline system.

BACKGROUND

Graphical processing units (GPUs) are primarily used to perform graphics rendering. Graphics rendering requires massive amounts of computation, especially in shader programs that are run while rendering. This computation requires a very large percentage of the power consumed by GPUs, and thus electronic devices that employ GPUs. In mobile electronic devices, processing power of GPUs, memory and power supplied by battery is limited due to the form factor and mobility of the electronic device.

Tile-based architecture has become popular in mobile GPUs due to its power efficiency advantages, in particular in reducing costly dynamic random access memory (DRAM) traffic. Advanced mobile GPU architectures may employ deferred rendering techniques to further improve power efficiency. Conventional techniques have a fixed configuration and cannot achieve the best efficiency in all situations since they cannot adapt to workload changes nor be optimized dynamically.

SUMMARY

One or more embodiments generally relate to adaptively and dynamically configuring a graphics pipeline system. In one embodiment, a method provides for dynamically configuring a graphics pipeline system. The method includes determining an optimal graphics pipeline configuration based on: determining granularity for the optimal pipeline configuration based on graphics state information and one or more factors. One or more of memory power consumption and computation power consumption of storing and regenerating intermediate results is estimated based on the graphics state information and the one or more factors. Runtime information for primitives is collected from graphics pipeline hardware including factors from tessellation or from graphics state information for determining geometry expansion at an output of one or more shader stages. Intermediate results to save from a previous processing pass are determined by comparing memory power consumption to save the intermediate results with computation power as well as memory power needed for regenerating the intermediate results in one or more later tile rendering passes.

In one embodiment a non-transitory processor-readable medium that includes a program that when executed on a processor performs a method comprising: determining an optimal graphics pipeline configuration based on: determining granularity for the optimal graphics pipeline configuration based on graphics state information and one or more factors. One or more of memory power consumption and computation power consumption of storing and regenerating intermediate results is estimated based on the graphics state information and the one or more factors. Runtime information for primitives is collected from graphics pipeline hardware including factors from tessellation or graphics state information for determining geometry expansion at an output of one or more shader stages. Intermediate results to save from a previous processing pass are determined by comparing memory power consumption to save the intermediate results with computation power as well as memory power needed for regenerating the intermediate results in one or more later tile rendering passes.

In one embodiment, a graphics processing system comprising: a graphics processing unit (GPU) including a graphics processing pipeline. The GPU dynamically determines an optimal pipeline configuration during a processing pass. The GPU is configured to: determine granularity for the optimal graphics processing pipeline configuration based on the graphics state information and the one or more factors; estimate one or more of memory power consumption and computation power consumption of storing and regenerating intermediate processing results based on graphics state information and one or more factors; collect runtime information for primitives from graphic processing pipeline hardware including factors from tessellation or using graphics state information for determining geometry expansion at an output of one or more shader stages; and determine intermediate processing results to store from a previous processing pass by comparing memory power consumption needed to save the intermediate processing results with computation power as well as memory power needed for regenerating the intermediate processing results in one or more later tile rendering passes.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide a deferred rendering pipeline (e.g., a tile-based deferred rendering (TBDR) pipeline) to make dynamic optimization by choosing appropriate information to defer, at various granularity, which provides optimal power efficiency and performance. One or more embodiments provide for a deferred rendering pipeline to adapt to workload changes and always make the optimal trade-offs to achieve best efficiency.

In one embodiment, a method provides determining an optimal pipeline configuration based on: estimating one or more of memory power consumption and computation power consumption of storing and regenerating intermediate results based on graphics state information and one or more factors. Granularity for the optimal graphics pipeline configuration is determined based on the graphics state information and the one or more factors. Runtime information for primitives is collected from graphics pipeline hardware including factors from tessellation or using graphics state information for determining geometry expansion at an output of one or more shader stages. Intermediate results to save from a previous processing pass are determined by comparing memory power consumption to save the intermediate results with computation power as well as memory power needed for regenerating the intermediate results in one or more later tile rendering passes.

Figure 1:
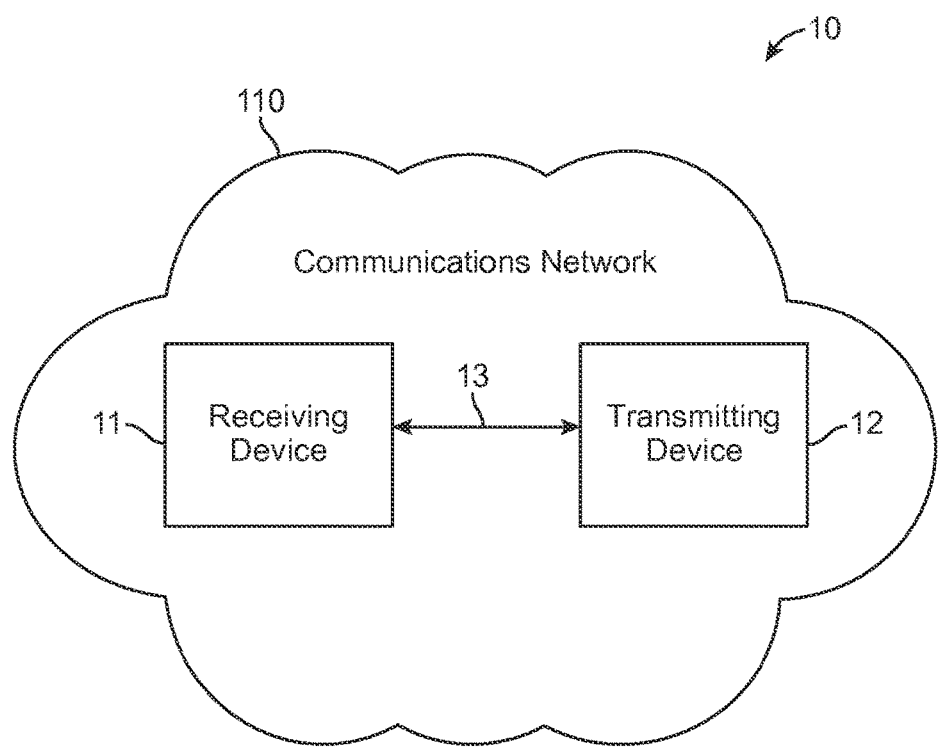
FIG. 1 shows a schematic view of a communications system, according to an embodiment.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, cellular systems/networks, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a BLACKBERRY®). Such protocols can include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
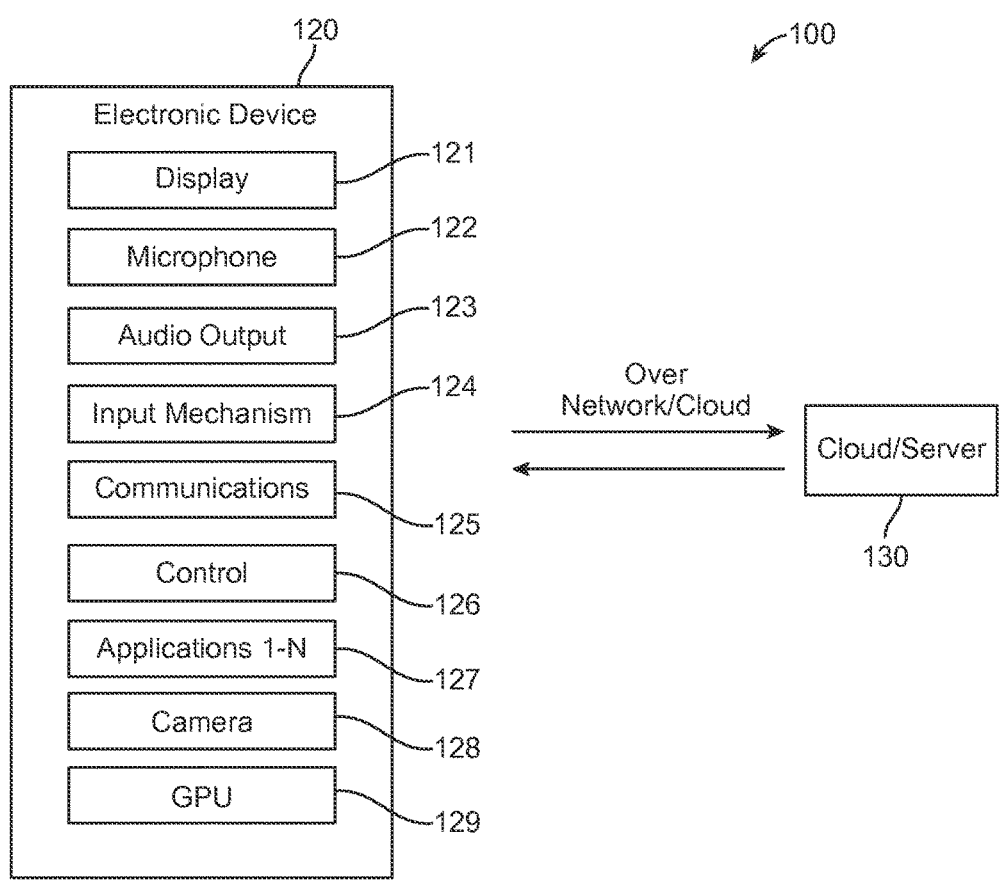
FIG. 2 shows a block diagram of architecture for a system including a mobile device including a graphical processing unit (GPU) interface, according to an embodiment.

FIG. 2 shows a functional block diagram of an architecture system 100 that may be used for graphics processing in an electronic device 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera interface 128, a GPU interface 129, and any other suitable components. In one embodiment, applications 1–N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), BLUETOOTH®, cellular systems/networks, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., FACEBOOK®, TWITTER®, etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1–N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera interface 128 comprises one or more camera devices that include functionality for capturing still and video images, editing functionality, communication interoperability for sending, sharing, etc., photos/videos, etc.

In one embodiment, the GPU interface 129 comprises processes and/or programs for processing images and portions of images for rendering on the display 121 (e.g., 2D or 3D images). In one or more embodiments, the GPU interface 129 may comprise GPU hardware and memory (e.g., DRAM, cache, flash, buffers, etc.). In one embodiment, the GPU interface 129 uses multiple (processing) passes (or stages/phases): a binning (processing) phase or pass (or frontend processing), which is modified to those typically used with the standard tile-based deferred rendering (TBDR) or other pipelines (e.g., Z Prepass pipelines), and a tile rendering phase or pass (or backend processing).

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
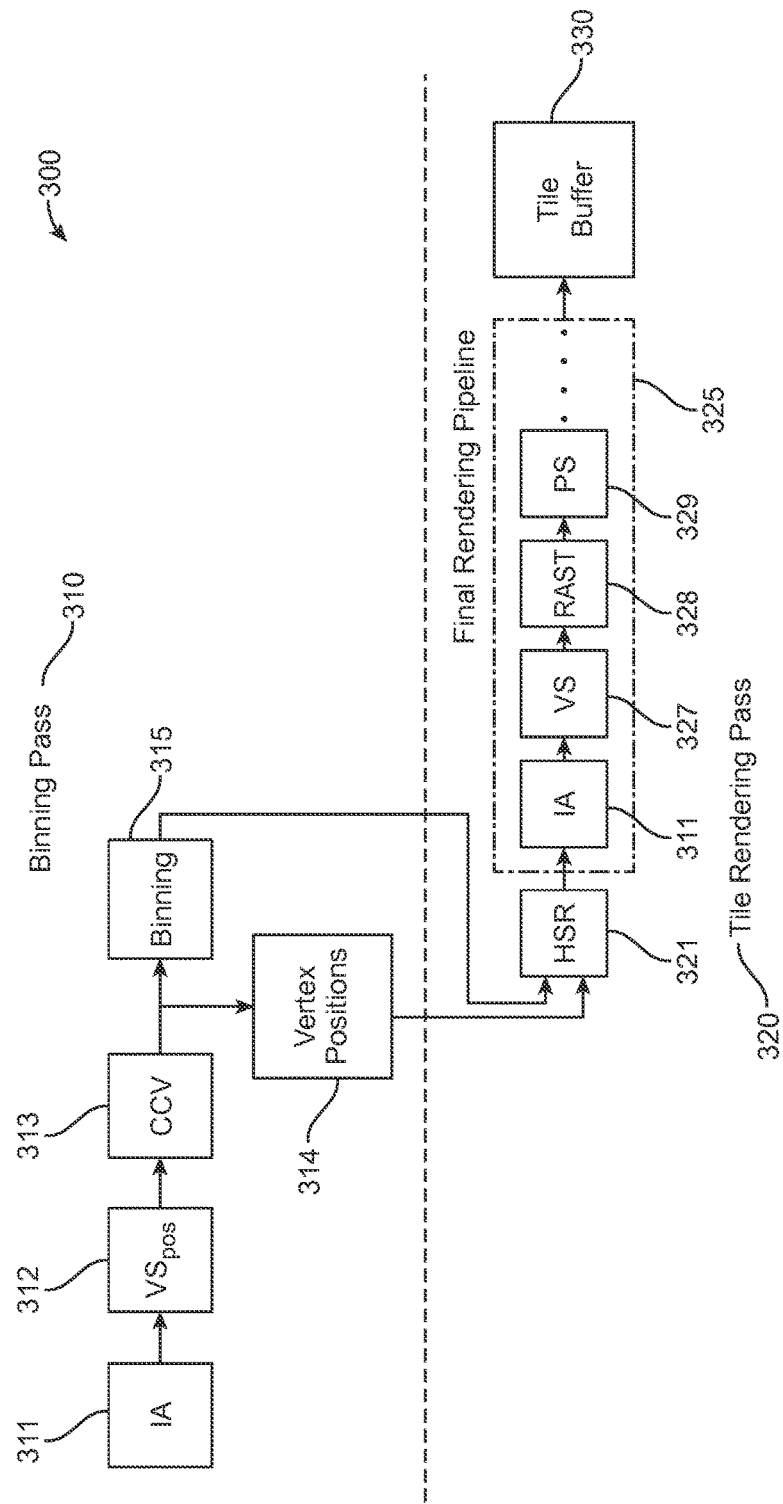
FIG. 3 shows an example tile-based deferred rendering (TBDR) pipeline for graphical processing.

FIG. 3 shows an example tile-based deferred rendering (TBDR) pipeline 300 for graphical processing. The TBDR pipeline 300 includes a binning (processing) pass 310 and a tile rendering (processing) pass 320. The binning pass 310 includes an input assembler unit (IA) 311, a vertex (position) shader ($VS_{POS}$ (position only)) 312, a cull, clip, viewport (CCV) 313, a binning unit 315, and a memory 314 (e.g., a buffer) for vertex attributes/positions.

The tile rendering pass 320 includes a hidden surface removal (HSR) unit 321, a final rendering pipeline 325 and a tile buffer 330. The final rendering pipeline includes an IA 311, a vertex shader (VFS) 327, a rasterizer (RAST) 328 and a pixel shader (PS) 329.

Power efficiency is one of the key goals in mobile GPU design. Tile-base architecture is popular in mobile device GPUs due to its power efficiency advantages, in particular in reducing DRAM traffic. By dividing the screen space into tiles and rendering the scene tile by tile, depth and color buffers for a tile can be small enough to be stored on-chip, and therefore power consuming DRAM traffic for accessing depth and color data may be avoided. The data in the on-chip buffer only needs to be written to DRAM once, after the tile is completely rendered. Advanced mobile GPU architectures also employ deferred rendering techniques to further improve power efficiency. By processing the geometry of the whole scene first and deferring the final rendering later, techniques performed by the HSR unit 321 can be applied to avoid unnecessary rendering work and only render pixels that are eventually visible in the scene. The TBDR pipeline 300 combines the advantages from both aforementioned techniques. The binning pass 310 processes the geometry of the whole scene once, which bins the primitives (e.g., triangles) into the corresponding screen tiles. The following tile rendering pass(es) of the final rendering pipeline 325 then processes each of the screen tiles, independently. For a given screen tile, only primitives that touch the tile will be rendered, typically after some form of a hidden surface removal technique (e.g., by HSR 321).

The binning pass 310 in the TBDR pipeline 300 needs to save information for each screen tile regarding the primitives that touch the tile so that the following tile rendering pass 320 can consume it and properly render the tile. In one variant of the TBDR pipeline 300, the binning pass 310 stores the transformed vertex attributes in memory 314, and in the tile rendering pass 320 the corresponding attributes are read back and the pipeline rasterizes the primitives using the already transformed attributes.

Figure 4:
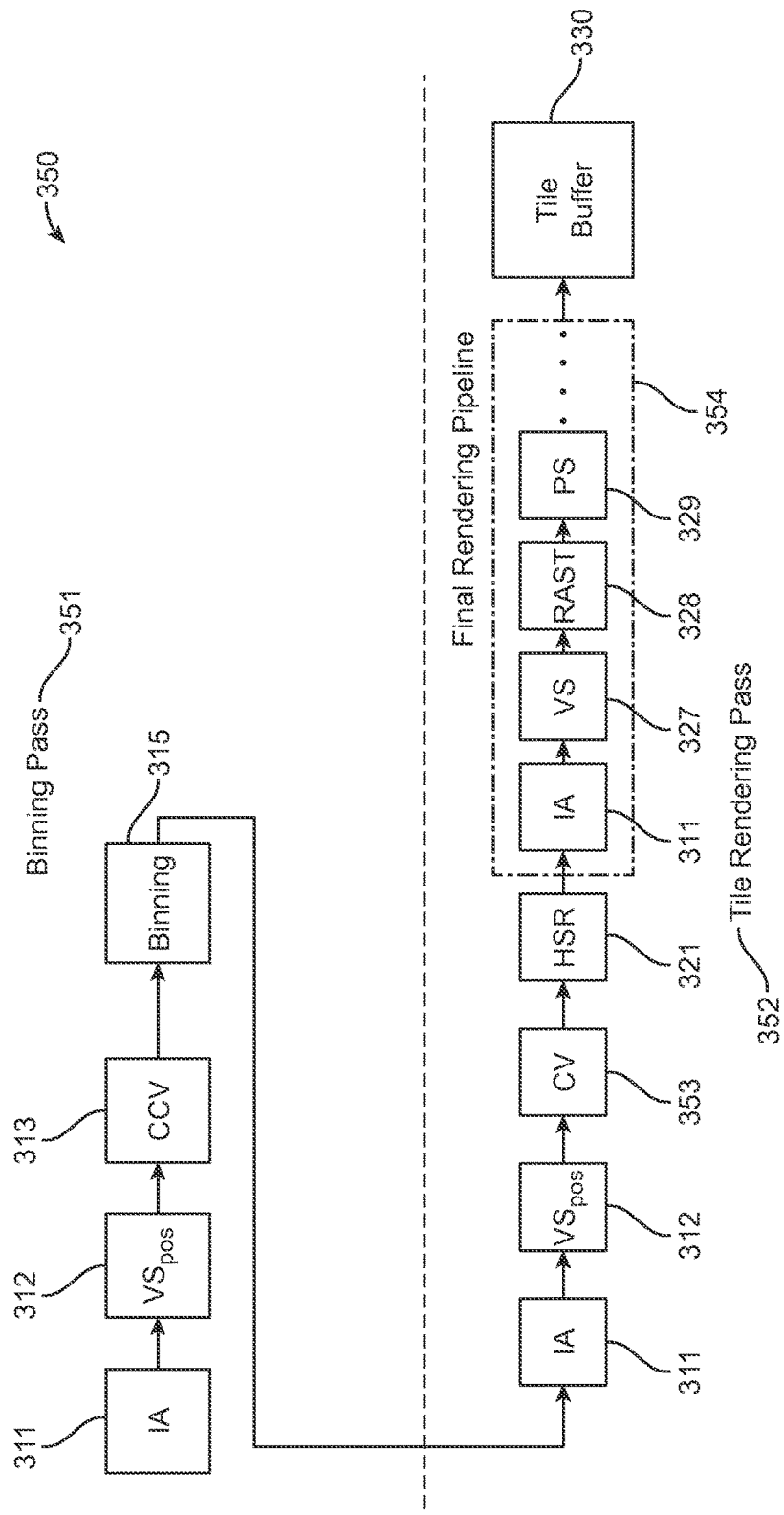
FIG. 4 shows an example TBDR pipeline with vertex positions reproduced in the tile-rendering pass.

FIG. 4 shows an example TBDR pipeline 350 with vertex positions reproduced in the tile-rendering pass 352. The TBDR pipeline 350 includes a binning pass 351 and the tile-rendering pass 352. The binning pass 351 includes IA 311, $VS_{POS}$ 312, CCV 313 and binning unit 315. The tile rendering pass 352 includes IA 311, $VS_{POS}$ 312, clip and viewport (CV) 353, HSR 321, the final rendering pipeline 354, and the tile buffer 330. The final rendering pipeline 354 includes IA 311, VS 327, RAST 328 and PS 329.

The TBDR pipeline 350, instead of storing the transformed attributes as with TBDR pipeline 300 (FIG. 3), the binning pass 351 only stores, for each tile, a list of primitives that touch the tile. In the tile rendering pass 352, the complete rendering pipeline, including the geometry processing stages (e.g., vertex shading by VS 327), is re-run to regenerate the attributes and then render the primitives. In terms of power efficiency, the TBDR pipeline 350 has an advantage over the TBDR pipeline 300 of less memory power consumption, because vertex attributes are typically a much larger amount of data to handle than primitive lists. On the other hand, the TBDR pipeline 300 has an advantage of less pipeline stages needed (e.g., vertex shading), and thus consumes less processing power in the tile rendering pass 320.

The overall power efficiency of a GPU system would be determined by both the binning pass and the tile rendering pass, and depending on the physical characteristics of the GPU system (e.g., energy cost for memory accesses relative to computation ops), as well as the application characteristics (e.g., the number of vertex attributes enabled and the complexity of the shaders), either the TBDR pipeline 300 or 350 approach may be more efficient than the other, in different situations. A single fixed pipeline configuration, however, is not optimal in reality as different application behaviors vary significantly.

In a generalized deferred rendering pipeline (e.g., TBDR pipeline 300 or 350), the binning pass is not restricted to pass only the transformed vertex attributes or the list of primitives covering the tile to the tile rendering pass(es). In one embodiment, the generalized TBDR pipeline may be modified in order to choose to save arbitrary information, e.g., the intermediate (processing) results produced at any point in the middle of the binning pass pipeline, and consume that in the tile rendering pass(es). When consuming the intermediate results saved during the binning pass, the tile rendering pass may restart the pipeline in the middle, at the point where the intermediate results were generated, and skip all previous stages in the pipeline since reproducing the intermediate results is no longer needed. Note that the pipeline may also choose not to save the results in the binning pass but to reproduce that in the tile rendering pass, if that is more beneficial.

In one embodiment, at any point of the graphics pipeline where the results produced at that point can be saved during the binning pass (e.g., binning pass 405, FIG. 5) and consumed in the tile rendering pass (e.g., tile rendering pass 406). In one embodiment, a TBDR is modified so that a trade-off may be determined by a GPU based on whether to save the information in the binning pass or to reproduce it in the tile rendering pass, based on certain criteria, such as implementation cost, complexity, power efficiency and performance. Passing information produced in the binning pass to tile rendering pass(es) may typically mean more memory power due to the added memory traffic for saving and restoring the saved information, whereas reproducing the results in tile rendering pass typically means more computation power for re-computing the results.

Figure 5:
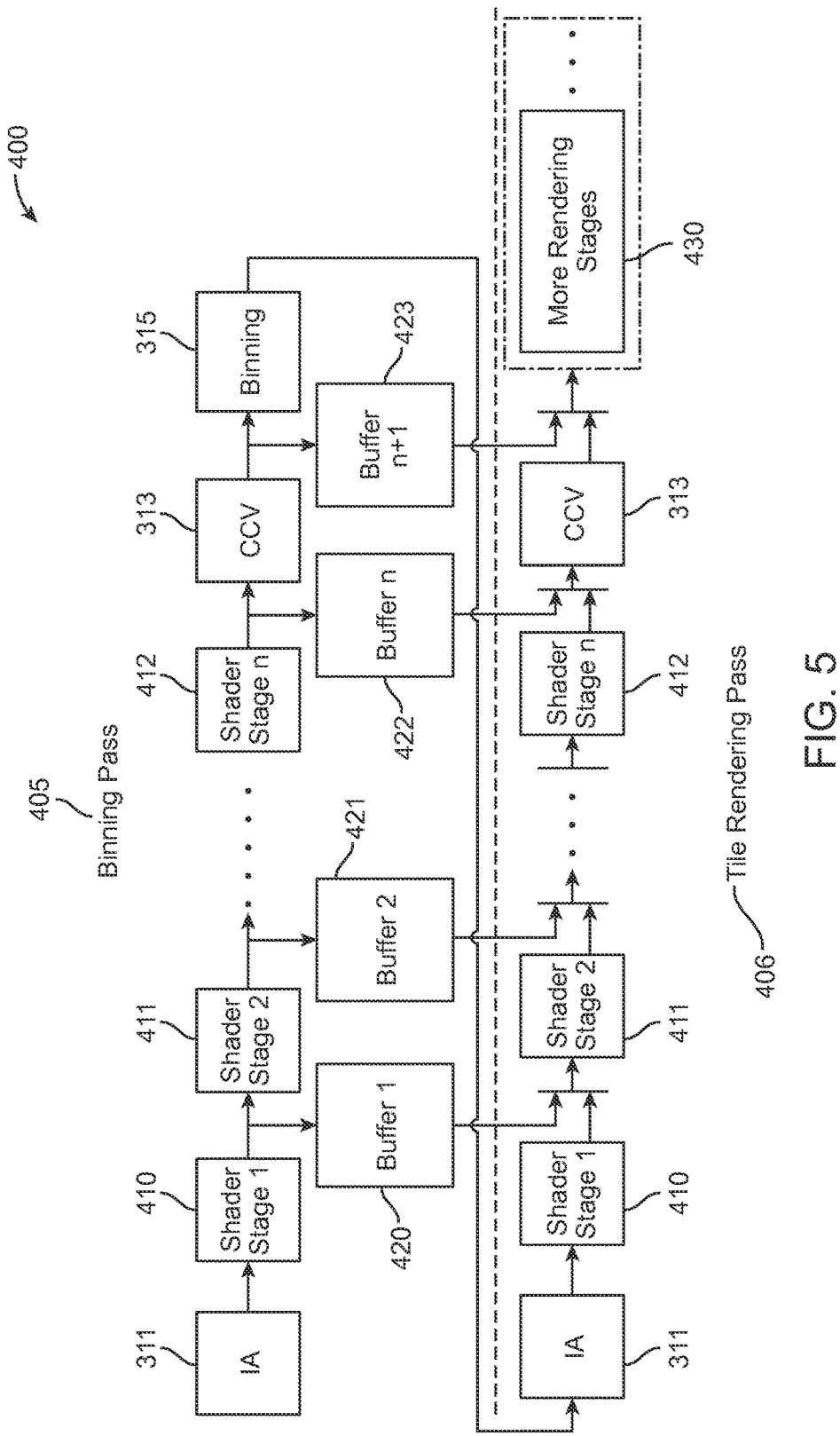
FIG. 5 shows an example TBDR pipeline with dynamic optimization, according to an embodiment.

FIG. 5 shows an example TBDR pipeline 400 with dynamic optimization, according to an embodiment. In one embodiment, the binning pass 405 includes IA 311, shader stages 1 410, 2 411 to n 412 (where n is a positive integer), CCV 313, and binning unit 315. The binning pass 405 further includes buffer 1 420 that stores output from the shader stage 1 410, buffer 2 421 that stores output from shader stage 2 411, buffer n 422 that stores output from the shader stage n 412, and buffer n+1 423 that stores output from the CCV 313.

The tile rendering pass 406 includes IA 311, shader stage 1 410, shader stage 2 411 to shader n 412, CCV 313 and more rendering stages 430 as needed. In one embodiment, the data stored in: buffer 1 420, buffer 2 421, buffer n 422 and buffer n+1 423 are passed to the tile rendering pass 406 as indicated in FIG. 5. The TBDR pipeline 400 makes optimal trade-offs adaptively, at various granularities.

In one or more embodiments, the adaptive and dynamic processing uses two mechanisms. A first mechanism is simple and efficient, and provides for the binning pass (e.g., binning pass 405) to produce the results at multiple points and save the results in temporary storage (e.g., buffer 1 420, buffer 2 421, buffer n 422 and buffer n+1 423), and provides the tile rendering pass(es) (e.g., tile rendering pass 406) to consume the saved results, generated from one or more different places in the TBDR pipeline (e.g., TBDR pipeline 400) during the binning pass, in proper order and at proper places in the TBDR pipeline. The second mechanism provides optimal decisions to be made on whether at each possible point in the TBDR pipeline, at a given time, the result produced in the binning pass should be passed to tile rendering pass(es) or it should be reproduced in the tile rendering pass(es).

In one embodiment, the binning pass may choose to produce and save any data for the tile rendering pass to consume, as long as it is beneficial. The output results at each logical or physical stage in the pipeline are candidates as these are typically easy to access without requiring additional logic, and may be directly consumed by the later stages in the tile rendering pass. In addition, there are often mechanisms that already exist in modern graphics pipelines that allow the saving of intermediate results from various pipeline stages to a temporary storage space for later use, such as the Stream Out mechanism in D3D and the Transform Feedback mechanism in OpenGL. In one or more embodiments, for each candidate point that may produce results that will be consumed in the tile rendering pass, there may be provided a separate buffer dedicated for this source to store the produced data. When a primitive is being processed in the binning pass, the GPU system may make the optimal trade-off by selecting the most beneficial one from the available options, i.e., saving the intermediate result produced from one of the candidate points, or not saving any intermediate results. In one or more embodiments, depending on the system needs, the decision may be made on a per-primitive basis at the finest granularity, or at a coarser granularity, such as on a per-draw call or per-frame basis.

In one or more embodiments, when a primitive is finally rendered in the tile rendering pass, the TBDR pipeline needs to know whether data has been saved for the primitive and where to fetch the data, and then skips the appropriate pipeline stage(s). In the case where the optimization decisions are made at a coarse granularity, e.g., on a per-frame basis, the pipeline may remain statically configured, e.g., always fetching data from one buffer and skip the corresponding pipeline stages, until a new decision is made. In the case where the optimization decision may be made on a per-primitive basis, additional information needs to be passed from the binning pass to specify, for each primitive, from which buffer the saved results should be fetched or it has to proceed through the full pipeline to reproduce all necessary data. For example, a 2-bit number will be needed for each primitive if there are four possibilities. Note that such information may additionally be compressed.

In one or more embodiments, three types of information may be produced in the binning pass and passed to the tile rendering pass, some of which may be optional. A first type of information specifies, after the binning pass, which primitive(s) will be rendered in the following rendering pass. For example, if a primitive is rejected for any reason (e.g., due to culling) in the binning pass it will not be rendered in the final rendering pass since it will not be visible in the final scene. The second type of information contains intermediate or final results of the primitives and vertices produced in the pipeline during the binning pass. These may include the shader outputs at a certain shader stage, or the post-CCV transformed attribute data. If the intermediate or final results of a render unit are passed from the binning pass to the tile rendering pass, the pipeline in the tile rendering pass may consume the saved information and skip all prior pipeline stages. The third type of information specifies, for each primitive, from where the saved information needs to be fetched from. This may be needed only if the optimization decisions are made at a fine granularity.

Depending on the design goal, the optimization decisions may be made based on different criteria. In mobile GPU design, power efficiency is crucial and therefore one or more embodiments focus on power efficiency. Saving results from the binning pass and avoiding re-computation in the tile rendering pass versus reproducing the results in the tile rendering pass, have different implications on power efficiency. The former approach would usually consume more power on memory accesses as a result of saving and restoring the results produced in the binning pass, whereas the latter approach would require spending more power on computation to reproduce the results. For ease of discussion, a simplified process is used for evaluating the power efficiency of each candidate. Real implementations may employ more advanced/sophisticated power estimation processes.

Two types of power consumptions, memory power and computation power, are considered in evaluating the trade-offs since they are the dominating factors in modern GPUs. For design option k, the total power needed to render a primitive (or a set of primitives) may be generally expressed as $$TotalPower_k = Power_{mem}(size) + \sum_n Power_{compute}(shader_n),$$

where $Power_{mem}(\ )$ denotes the power required for reading and writing data from/to memory in all passes, and $Power_{compute}(shader_n)$ denotes all shader stages that are needed in the specific option. In most cases, most terms in the above equation remain the same, since the difference between two options usually is only whether intermediate results at one point is saved in the binning pass or the tile rendering pass will reproduce it and the rest of the pipeline remain the same.

To make the optimization decision, the option that leads to the minimal TotalPower needs to be found, either by directly computing the TotalPower for each option or by using more optimized methods, such as only computing the differences when most of the terms in the equation remain the same. In a simple graphics pipeline, e.g., with only a vertex shader in the geometry processing stage, the equations needed for evaluating the options may remain the same for a large chunk of work, e.g., one or multiple draw calls, until the graphics state change, e.g., the number of attributes per vertex is changed and/or the shader program is changed. In this case, the optimization decision may be made at a coarse granularity, possibly by the GPU driver software as all the information needed for the estimation is known ahead of the time by the GPU driver software.

Figure 6:
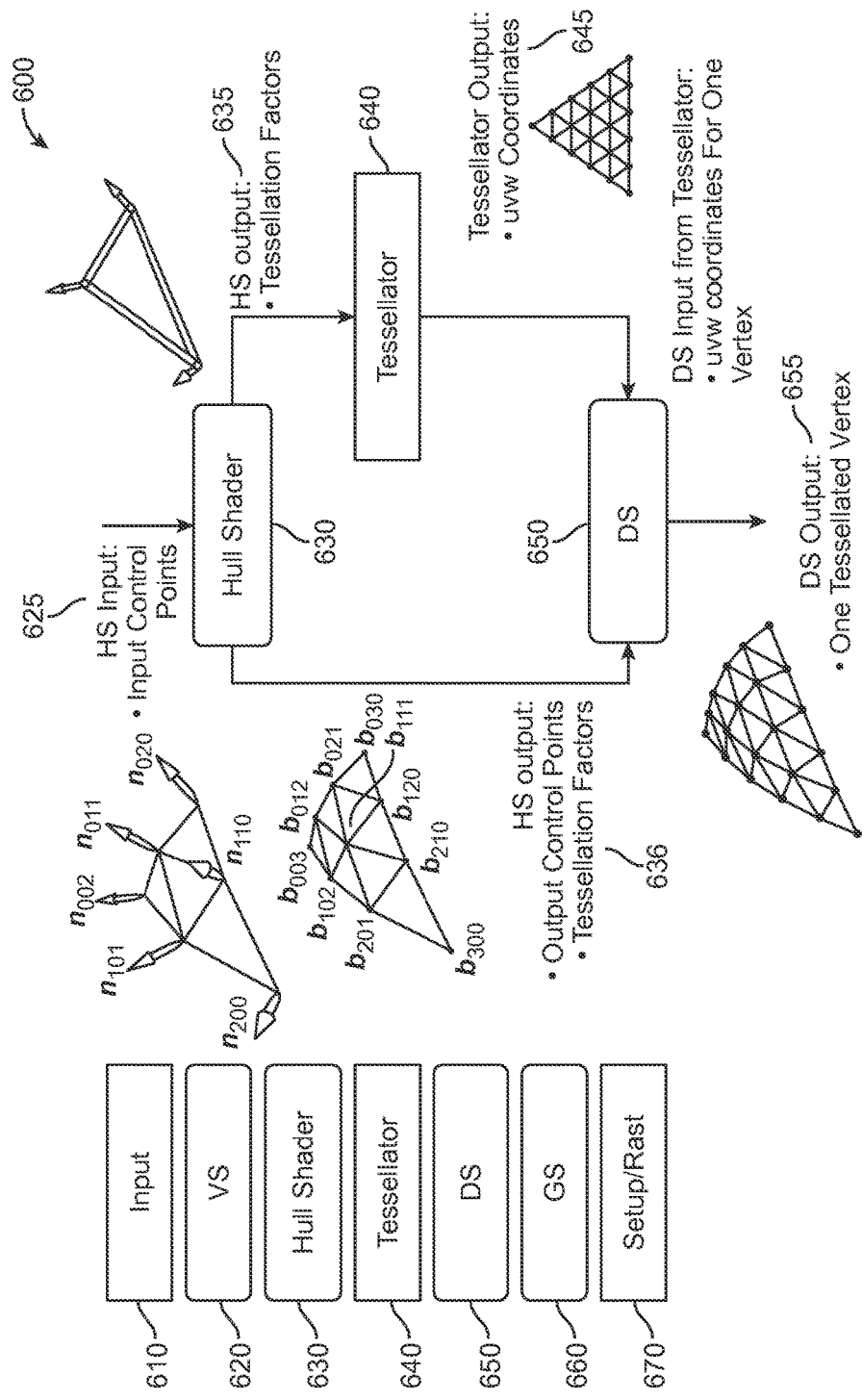
FIG. 6 shows an overview of a data flow diagram for a TBDR pipeline with tessellation, according to an embodiment.

FIG. 6 shows an overview 600 of a data flow diagram for a graphics pipeline with tessellation. With tessellation a coarse input surface with low details can be sub-divided into fine-grained primitives and eventually produce high-detailed geometry. In the overview 600, the input data is processed in a graphics pipeline including VS 620, hull shader (HS) 630, tessellator 640, domain shader (DS) 650, geometry shader (GS) 660 and setup and RAST 670.

After the VS 620 processes the input 610 (e.g., input course surface), the output from the VS 620 is input as input control points 625 to the HS 630. The output from the HS 635 is input to the tessellator 640 as tessellation factors, and the output including output control points are input as tessellation factors 636 to the DS 650. The tessellator output 645 (e.g., u, v, w coordinates) are input to the DS 650 as u, v, w coordinates for one vertex. The output 655 from the DS 650 includes one tessellated vertex.

Figure 7:
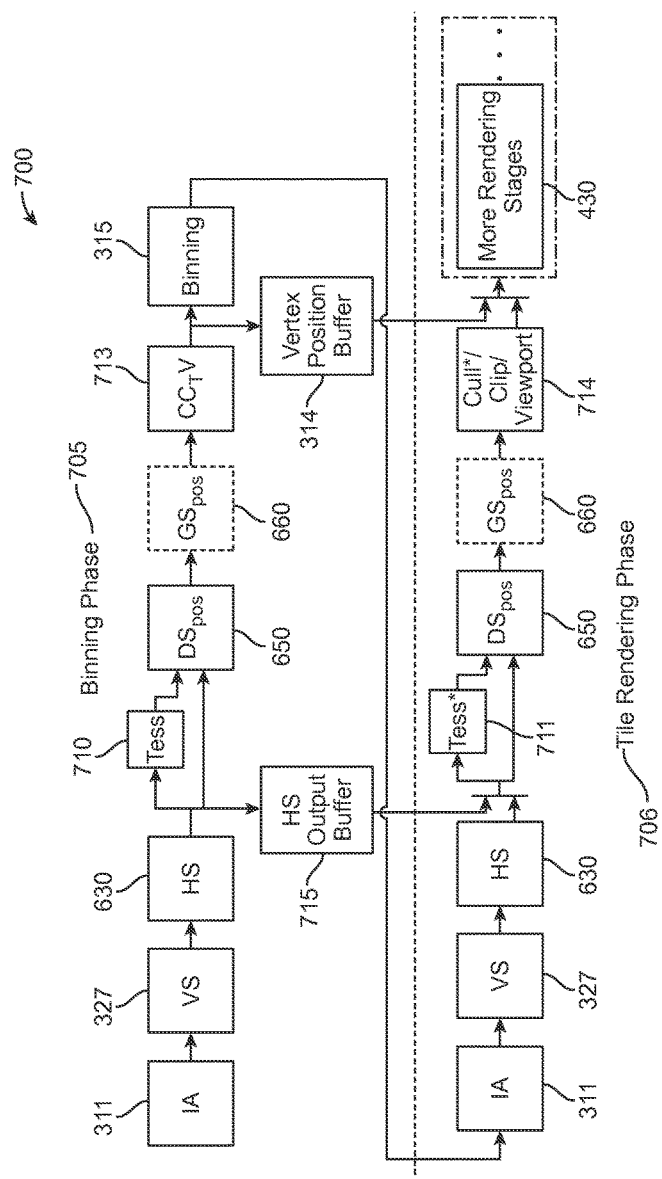
FIG. 7 shows an example of a dynamically optimized TBDR pipeline with tessellation, according to an embodiment.

FIG. 7 shows an example of a dynamically optimized TBDR pipeline 700 with tessellation, according to an embodiment. In this more advanced graphics pipeline with tessellators 710 and 711, and/or geometry shaders $GS_{POS}$ 660 enabled, each input primitive may introduce a different amount of work into the dynamically optimized TBDR pipeline 700. To obtain accurate estimation, information about the primitive needs to be collected at run time by the dynamically optimized TBDR pipeline 700 hardware, and the optimization decision may be made on a per-primitive basis, based on the run time information from the dynamically optimized TBDR pipeline 700 hardware as well as the graphics state information, possibly from GPU driver software. In one embodiment, the dynamically optimized TBDR pipeline 700 includes a binning phase or pass 705 and a tile rendering phase or pass 706.

In one embodiment, the binning phase or pass 705 includes the IA 311, VS 327, HS 630, tessellator 710, $DS_{POS}$ (position only) 650, $GS_{POS}$ (position only) 660, $CC_TV$ 713, and binning unit 315. In one embodiment, intermediate results output from the HS 630 are saved (stored) in the HS output buffer 715, and the intermediate results output from the $CC_TV$ 713 are saved (stored) in the vertex position buffer 314.

In one embodiment, the tile rendering phase or pass 706 includes the IA 311, VS 327, HS 630, tessellator 711, $DS_{POS}$ 650, $GS_{POS}$ 660, CCV 714 and additional rendering stages 430. The dynamically optimized TBDR pipeline 700 may choose to make the decision at a coarser granularity to reduce implementation cost or system complexity. The decision may not be optimal for every primitive but on average the resulting dynamically optimized TBDR pipeline 700 may still be more power efficient than an un-optimized one.

Based on the nature of the shaders and practical considerations, in one embodiment the number of options for dynamically configuring the graphics pipeline is limited to three, i.e., for each input primitive, the binning pass may choose to save the output from the HS 630 stage, or the final transformed vertex positions from $CC_TV$ 713, or not save any intermediate results and let the tile rendering phase or pass 706 to rerun the whole dynamically optimized TBDR pipeline 700. Note that in a multi-pass deferred rendering pipeline where the rendering phase consists of more than one pass, the same optimization may be applied to all passes.

Figure 8:
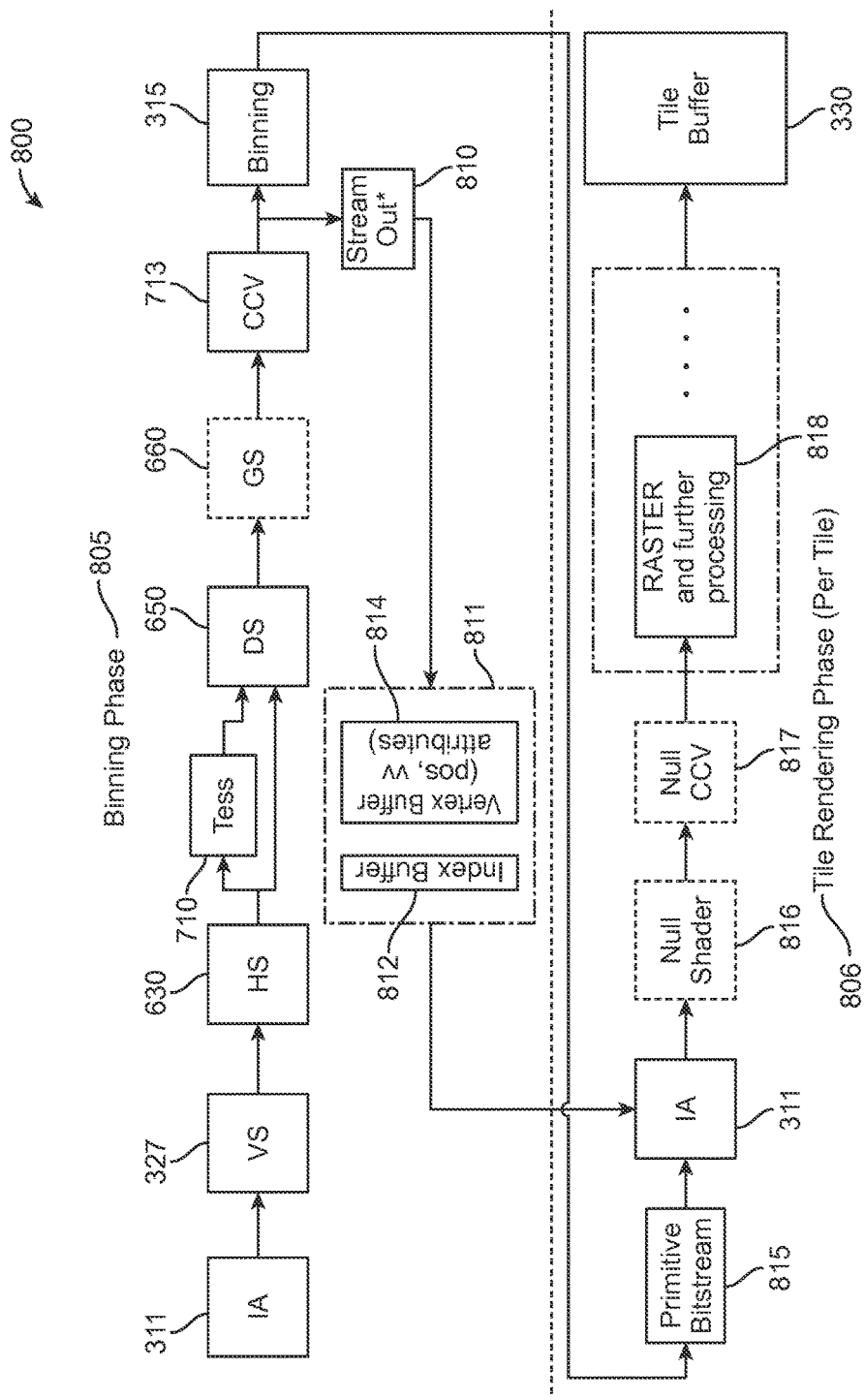
FIG. 8 shows an example of a TBDR pipeline with tessellation that may be employed, according to an embodiment.

FIG. 8 shows an example of a TBDR pipeline 800 with tessellation only in the binning phase or pass 805 that may be employed, according to an embodiment. The dynamically optimized TBDR pipeline 800 represents a baseline model and includes a binning phase or pass 805 and a tile rendering phase or pass 806.

In one embodiment, the binning phase or pass 805 includes the IA 311, VS 327, HS 630, tessellator 710, DS 650, GS 660, CCV 713, a stream out unit 810 and binning unit 315. In one embodiment, intermediate results output from the CCV 713 are saved (stored) in the memory 811, which includes an index buffer 812 and a vertex buffer 814 that saves position and VV attributes.

In one embodiment, the tile rendering phase or pass 806 includes a memory for storing the primitive bit stream 815, the IA 311, null shader 816, null CCV 817, RAST and further processing 818 and the tile buffer 330. The dynamically optimized TBDR pipeline 800 requires minimal changes to basic TBDR pipeline configurations.

Figure 9:
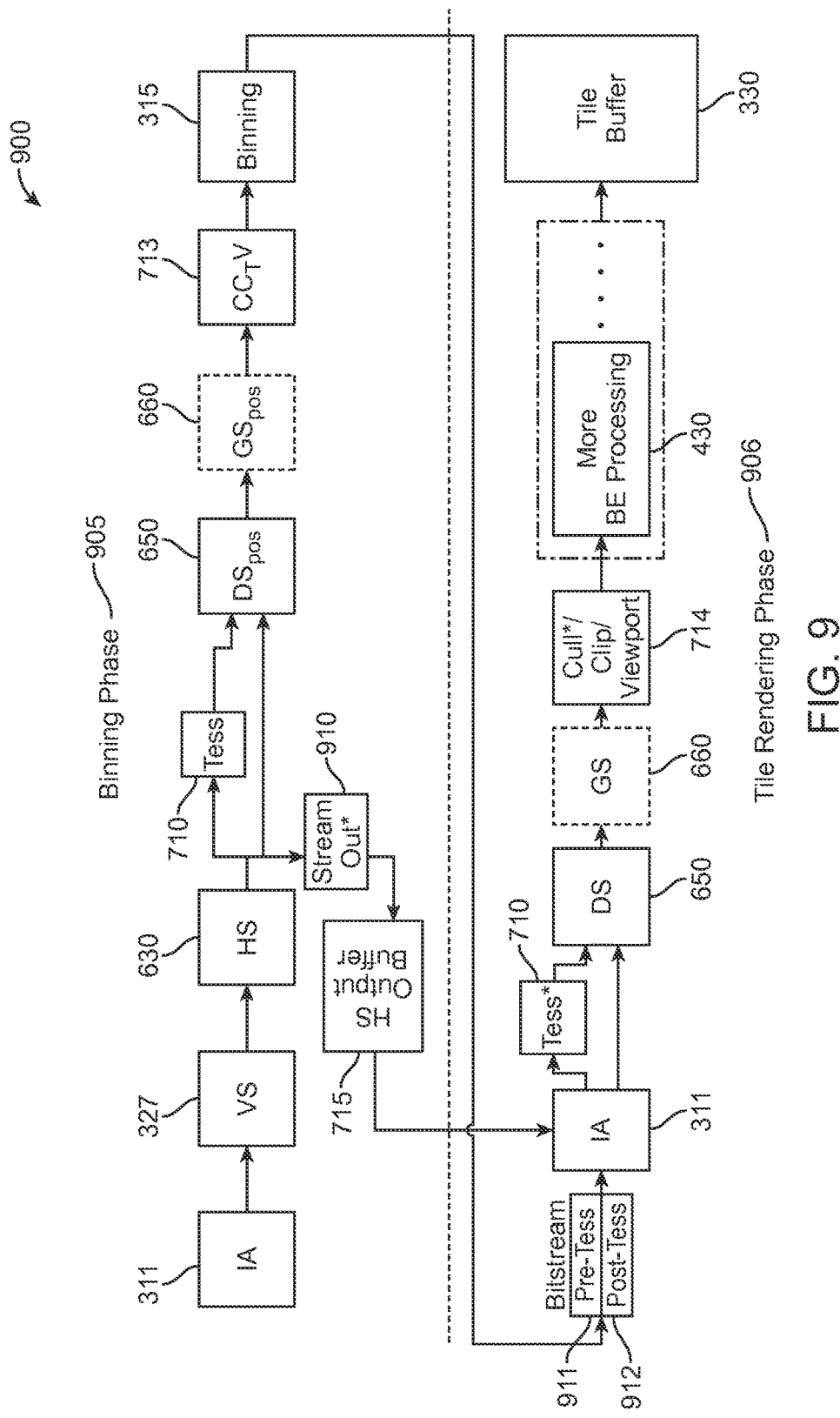
FIG. 9 shows yet another example of a TBDR pipeline with tessellation that may be employed, according to an embodiment.

FIG. 9 shows yet another example of a TBDR pipeline 900 with tessellator 710 in the binning phase or pass 905 and in the tile rendering phase or pass 906 that may be employed, according to an embodiment.

In one embodiment, the binning phase or pass 905 includes the IA 311, VS 327, HS 630, tessellator 710, $DS_{POS}$ 650, $GS_{POS}$ 660, $CC_TV$ 713, a stream out unit 910 and binning unit 315. In one embodiment, intermediate results output from the HS 630 streamed out from the stream out unit 910 to memory 715 where they are saved (stored).

In one embodiment, the tile rendering phase or pass 906 includes memory for storing the primitive bit stream for pre-tessellator results 911 and post-tessellator results 912, the IA 311, tessellator 710, DS 650, GS 660, CCV 714, further (backend) processing 430 and the tile buffer 330. The dynamically optimized TBDR pipeline 900 represents a more optimized pipeline that requires little extra changes over the baseline design (e.g., the dynamically optimized TBDR pipeline 800, FIG. 8) plus a set of incremental optimizations.

A hybrid pipeline based on the baseline design and the current target design allows finding best trade-off between memory access power and computation power, on a per patch basis. A patch typically touches multiple tiles and in tile rendering phase, processing a partial patch is the most important case. Partial patch processing is inefficient with existing tessellator designs. Existing tessellator designs tessellate one patch (or a regular sub-patch) at a time, but cannot efficiently produce an arbitrary subset of the primitives on the tessellated mesh. It is common that only a small portion of a patch touches a tile, and tessellating a whole patch to generate just a few primitives leads to bad performance and power efficiency.

In one or more embodiments, the tessellator designs provide for efficient tessellation of arbitrary primitives on the tessellated mesh. In one example, the binning phase or pass generates two bit streams for each tile. For a pre-tessellated bit stream: one bit per original patch. If a patch touches a tile, the corresponding bit is set. This is the same as the bit stream in a non-tessellation case. In one example, for post-tessellator bit streams: one bit per primitive on the tessellated mesh, for visible patches only. The pre-tessellator bit stream informs the IA of which entry in the HS output buffer is for the current patch; post-tessellator bit stream informs the tessellator which primitives on the tessellated patch are visible to this tile.

In another embodiment, a hybrid dynamically optimized TBDR pipeline may be implemented and may determine on-the-fly whether to pass pre-expansion data or post-expansion data, on a per-patch basis. For patches with high level of details (LODs), a write out pre-tessellator 911 HS 630 output; for patches with very low LODs and/or compute-extensive DS 650/GS 660 shader, write out post-tessellator 912 data (DS 650/GS 660 output or even $CC_T V$ 713 output data). The determination of which route to employ may depend purely on LOD produced by the HS 630, or a driver configured threshold, e.g., based on profiling data (combining shader complexity, pre-tessellator and post-tessellator attribute count, LOD, etc.). Passing a third bit stream to the tile rendering phase or pass 906 indicating which case a patch belongs to. In the tile rendering phase 906, patches that need DS 650/GS 660 will invoke proper shader work whereas the rest of the patches will bypass shader stages. May achieve optimal trade-off between energy costs for memory accesses and computation, and thus high power efficiency.

In one or more embodiments, data compression techniques may be used to further reduce power cost for storing/retrieving binning data. Advanced patch-based culling techniques may be employed where a process for culling a patch early in the pipeline, before the geometry expansion, may significantly reduce unnecessary work.

One or more embodiments may avoid duplicated rendering of shared patch edges. Rendering of the shared patch edges may be performed only once. Switching between a baseline dynamically optimized TBDR pipeline and other pipeline configurations may be performed if all modes are based on the same base pipeline.

Patches may have significantly different expansion ratios, i.e., given the same amount of input, the actual amount of work on a GPS can be very different. In one embodiment, post-tessellator work redistribution may be performed, i.e., dividing tessellated meshes into sub-meshes of roughly equal size and redistributing sub-meshes to all GPS's. This requires considerable amount of changes to the existing pipeline, i.e., dividing a pipeline into two phases which allows sub-patch redistribution between the two sub-pipelines. Another embodiment may employ pre-tessellator dynamic load balancing. In one example, this requires each GPS to be free of dependency on other GPS's. This often cannot be satisfied, i.e., multiple processing cores usually needs to re-synchronize at some point, e.g., to respect API order requirement. Another example may provide that workload imbalance due to tessellation is only a matter in the binning phase or pass: either do not perform tessellation in the tile rendering phase (baseline design), or the tessellator design is immune to imbalance in the tile rendering phase or pass. With efficient partial patch processing, in the tile rendering phase or pass, the processing time needed depends only on the number of post-tessellator visible primitives and is independent of the expansion ratio of any patches The binning phase or pass does not require synchronization among GPSs. In one example, stream out requires synchronization to respect the API order, but the only case where synchronization is affected by expansion is when :Stream Out is enabled, Tessellation is enabled, GS is enabled, and GS has unknown expansion.

Figure 10:
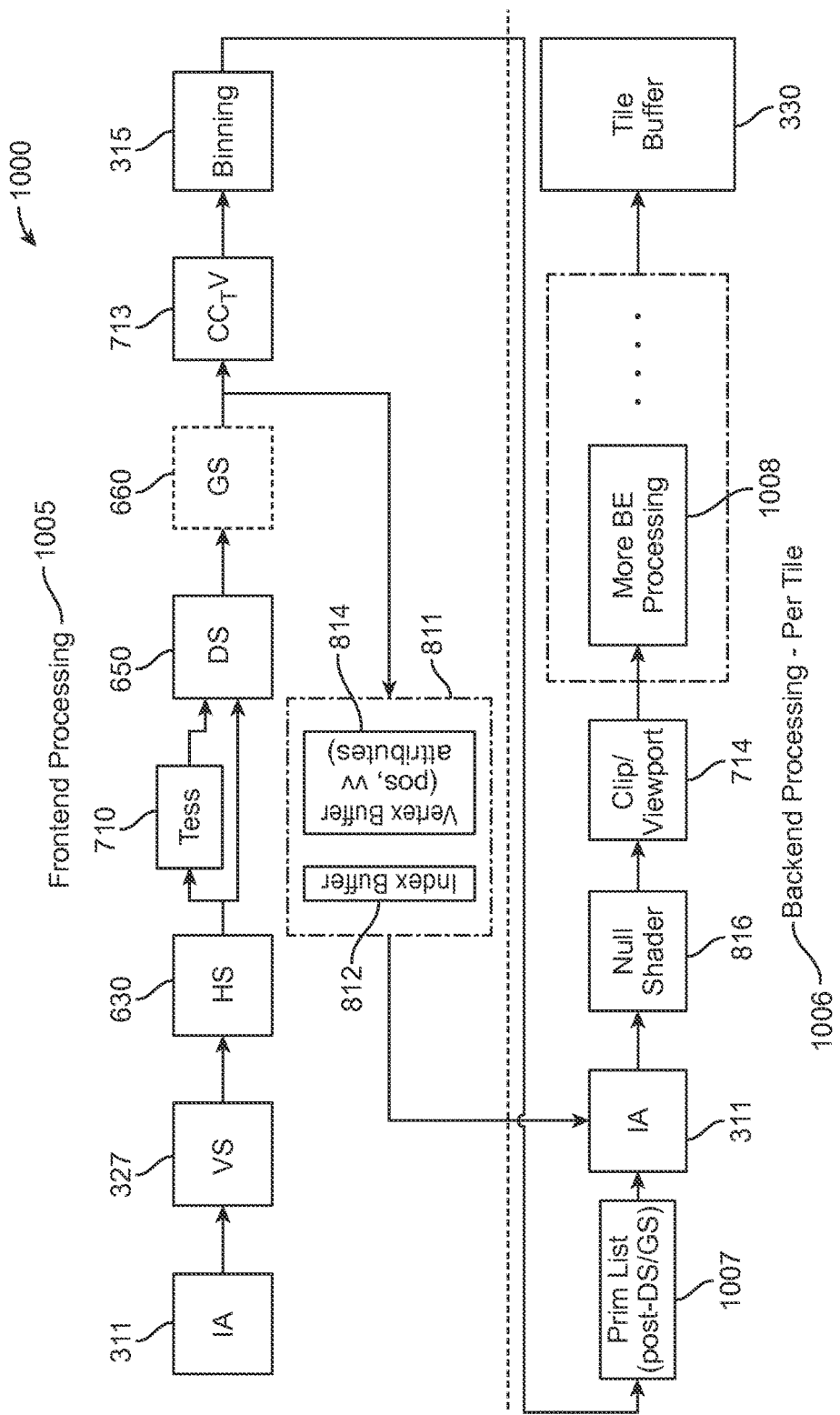
FIG. 10 shows an example of a TBDR pipeline with tessellation in the frontend processing only that may be employed, according to an embodiment.

FIG. 10 shows an example of a TBDR pipeline 1000 with tessellation 710 in the frontend processing 1005 only that may be employed, according to an embodiment. In one embodiment, the frontend processing 1005 includes the IA 311, VS 327, HS 630, tessellator 710, DS 650, GS 660, $CC_T V$ 713, and binning unit 315. In one embodiment, intermediate results output from the GS 660 are saved (stored) in memory 811 where they are saved (stored).

In one embodiment, the backend processing 1006 includes memory 1007 for storing the primitive list for post-DS/GS, the IA 311, Null shader 816, clip, viewport (CV) 714, further (backend) processing 1008 and the tile buffer 330. The dynamically optimized TBDR pipeline 1000 employs tessellation in the frontend processing 1005 only. The frontend processing 1005 runs a full shader stack, and passes all of the post-tessellator final vertex attributes to the backend processing 1006. The backend processing 1006 runs only a pass-through shader to pass fetched vertex attributes to later stages (e.g., additional backend processing 1008).

Figure 11:
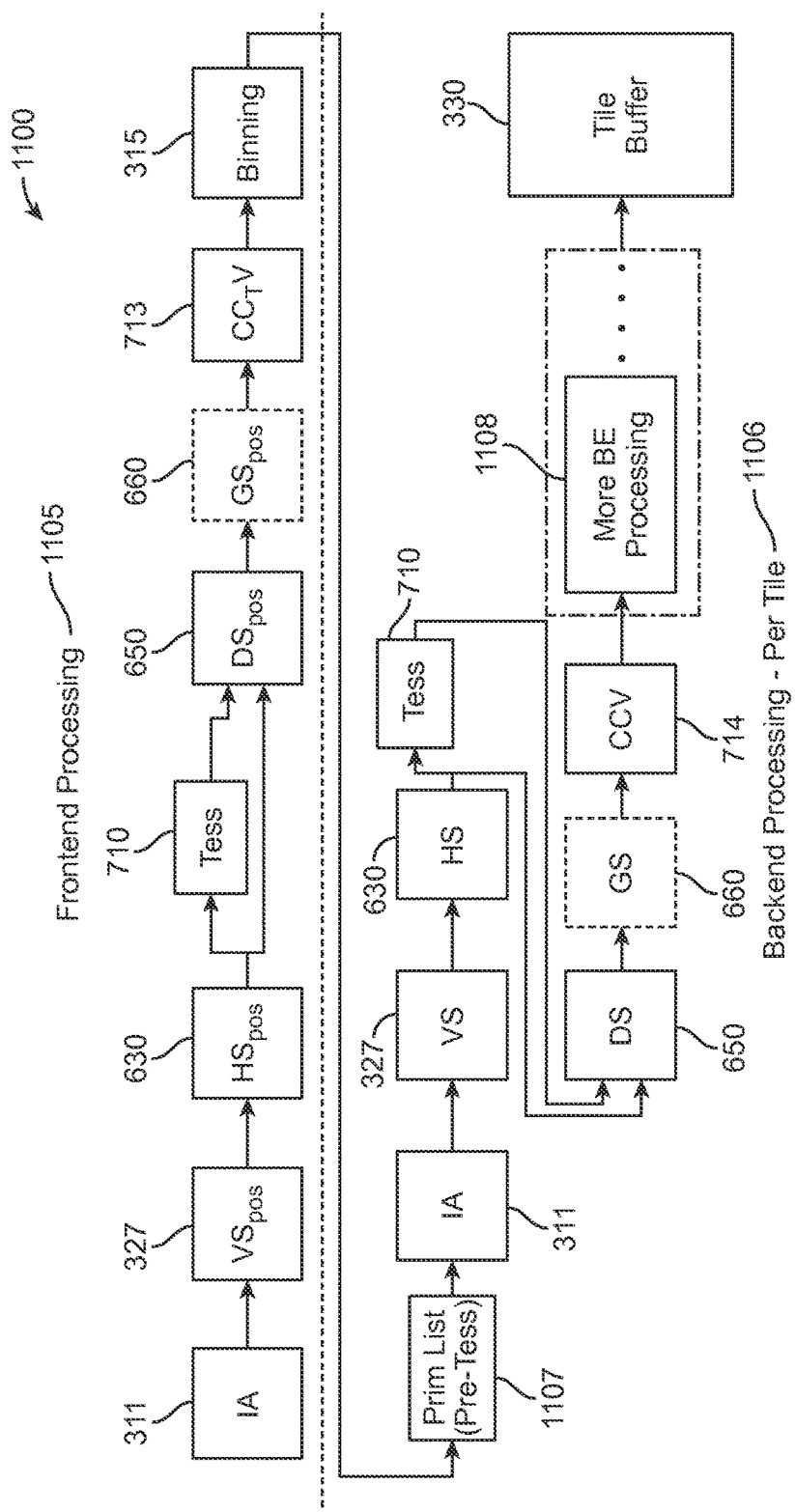
FIG. 11 shows an example of a TBDR pipeline with tessellation in the frontend and backend processing that may be employed, according to an embodiment.

FIG. 11 shows an example of a TBDR pipeline 1100 with tessellation in the frontend processing 1105 and the backend processing 1106 that may be employed, according to an embodiment. In one embodiment, the frontend processing 1105 includes the IA 311, $VS_{POS}$ 327, $HS_{POS}$ 630, tessellator 710, $DS_{POS}$ 650, $GS_{POS}$ 660, $CC_T V$ 713, and binning unit 315.

In one embodiment, the backend processing 1106 includes memory 1107 for storing the primitive list for pre-tessellation, the IA 311, VS 327, HS 630, tessellator 710, DS 650, GS 660, CCV 714, further (backend) processing 1108 and the tile buffer 330. The dynamically optimized TBDR pipeline 1100 employs the frontend processing 1105 and runs backend processing 1106 (only) shader stack (VS 327, HS 630, DS 650, and GS 660). The frontend processing 1105 passes only visibility of pre-tessellator patch information to the backend processing 1106. The backend processing 1106 re-runs a full shader stack and re-tessellates all visible patches, and all tessellated primitives are processed.

Figure 12:
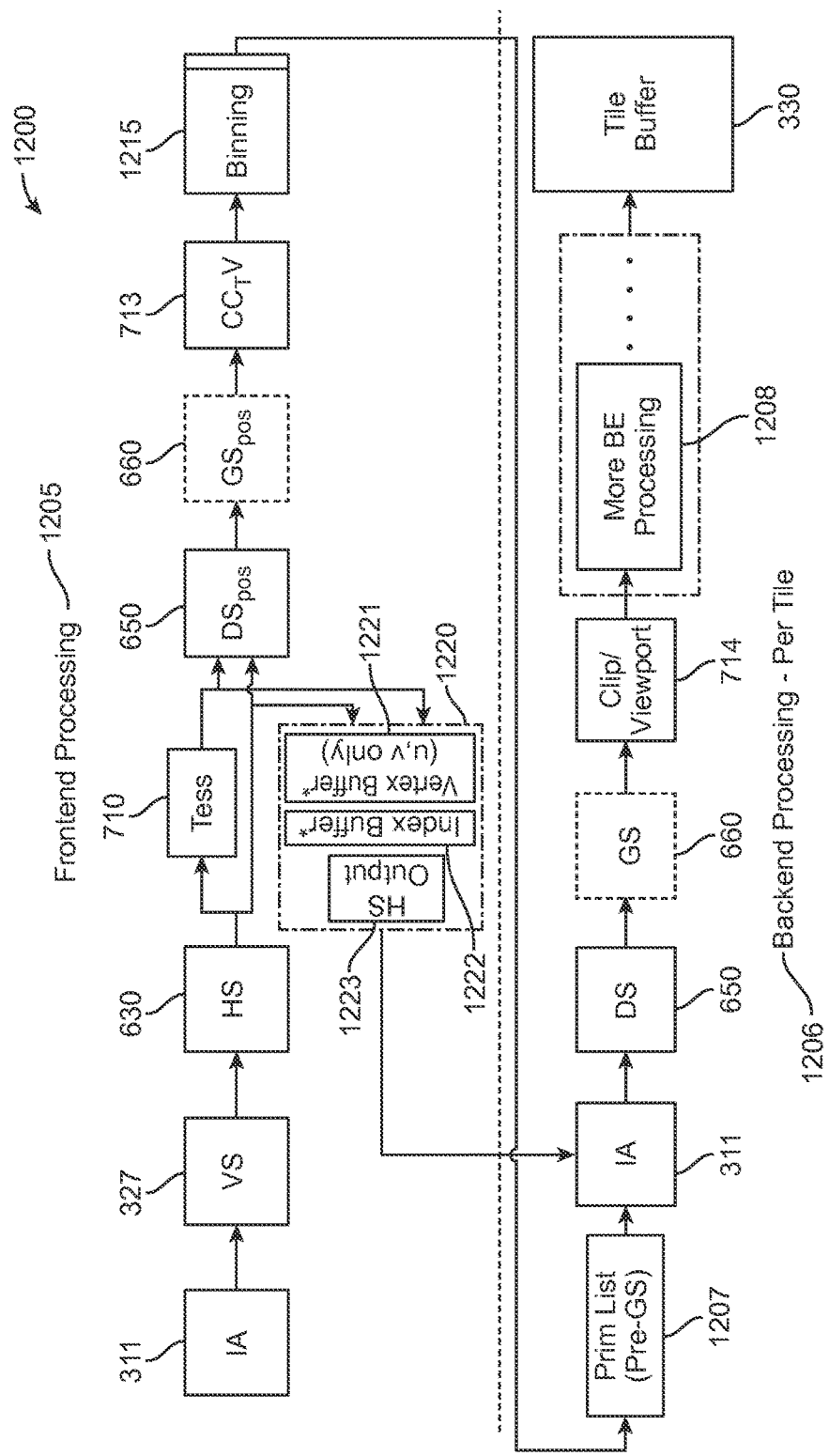
FIG. 12 shows another example of a TBDR pipeline with tessellation in the frontend processing only that may be employed, according to an embodiment.

FIG. 12 shows another example of a TBDR pipeline 1200 with tessellation in the frontend processing only that may be employed, according to an embodiment. In one embodiment, the frontend processing 1205 includes the IA 311, VS 327, HS 630, tessellator 710, $DS_{POS}$ 650, $GS_{POS}$ 660, $CC_T V$ 713, and binning unit 1215. In one embodiment, the frontend processing 1205 includes a memory 1220 including an HS output buffer 1223, an index buffer 1222 and a vertex buffer 1221 (for storing u and v information only).

In one embodiment, the backend processing 1206 includes memory 1207 for storing the primitive list for pre-GS intermediate results, the IA 311, DS 650, GS 660, CV 714, further (backend) processing 1208 and the tile buffer 330. The dynamically optimized TBDR pipeline 1200 employs the frontend processing 1205 and runs the tessellator 710 in the frontend 1205 only. The frontend processing 1205 runs a full VS+HS, and position-only DS/GS shader processing. The frontend 1205 passes only (u, v) attributes of tessellated vertex information to the backend processing 1206. The backend processing 1206 re-runs DS/GS shader processing to generate all final attributes.

Figure 13:
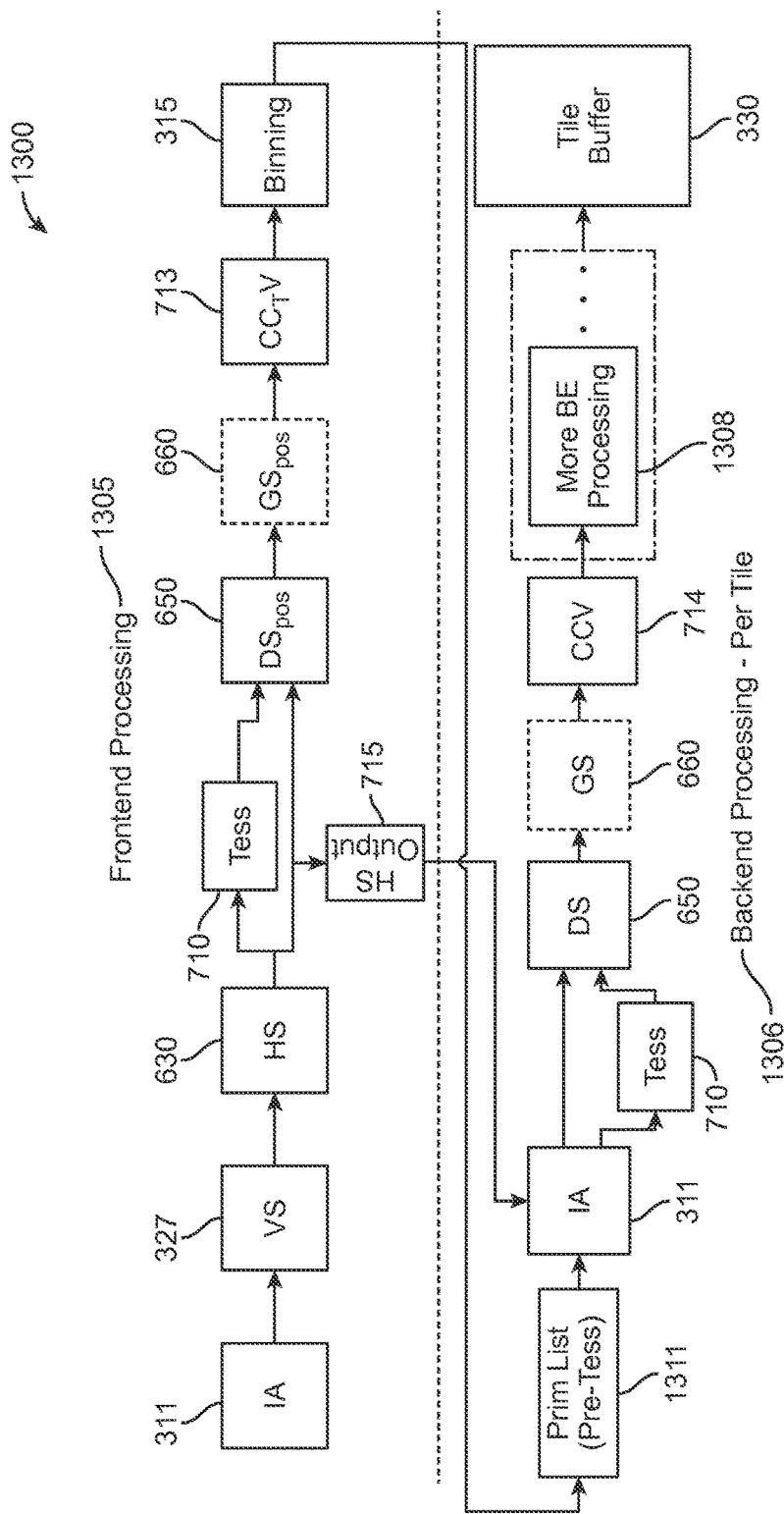
FIG. 13 shows another example of a TBDR pipeline with tessellation in the frontend and backend processing that may be employed, according to an embodiment.

FIG. 13 shows another example of a TBDR pipeline 1300 with tessellation in the frontend 1305 processing and the backend processing 1306 that may be employed, according to an embodiment. In one embodiment, the frontend processing 1305 includes the IA 311, VS 327, HS 630, tessellator 710, $DS_{POS}$ 650, $GS_{POS}$ 660, $CC_T V$ 713, and the binning unit 315. In one embodiment, the frontend processing 1305 includes a memory 715 including an HS output buffer.

In one embodiment, the backend processing 1306 includes memory 1311 for storing the primitive list for pre-tessellated intermediate results, the IA 311, tessellator 710, DS 650, GS 660, CCV 714, further (backend) processing 1308 and the tile buffer 330. The dynamically optimized TBDR pipeline 1300 frontend 1305 runs a full processing for VS+HS, and position-only DS/GS. The frontend processing 1305 passes only visibility of pre-tessellation patch information to the backend 1306. The backend processing 1306 re-tessellates all visible patches. The backend processing 1306 only runs shader processing for DS/GS. All tessellated primitives are processed.

Figure 14:
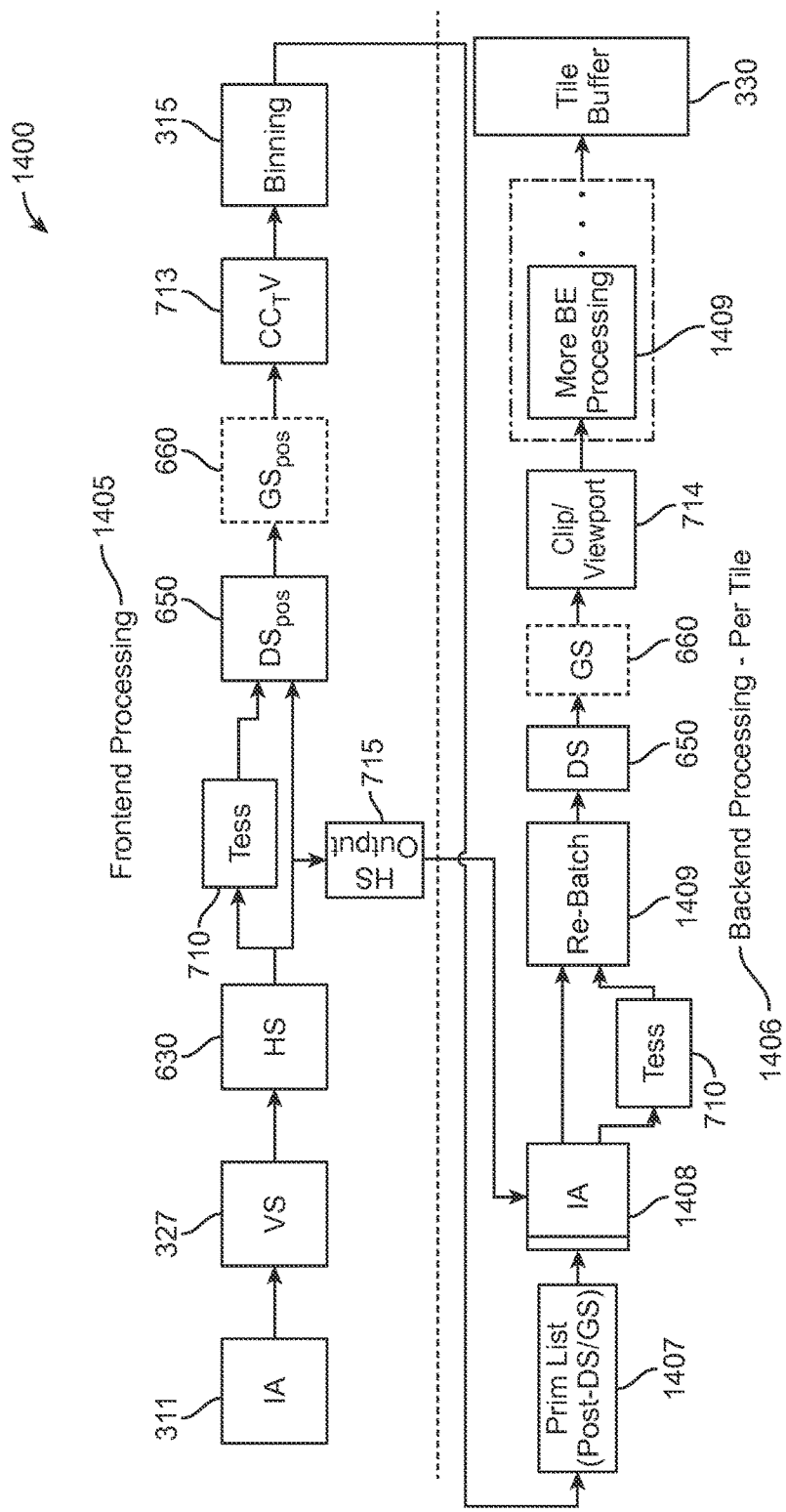
FIG. 14 shows yet another example of a TBDR pipeline with tessellation in the frontend and backend processing that may be employed, according to an embodiment.

FIG. 14 shows yet another example of a TBDR pipeline 1400 with tessellation in the frontend processing 1405 and backend processing 1406 that may be employed, according to an embodiment. In one embodiment, the frontend processing 1405 includes the IA 311, VS 327, HS 630, tessellator 710, $DS_{POS}$ 650, $GS_{POS}$ 660, $CC_TV$ 713, and the binning unit 315. In one embodiment, the frontend processing 1405 includes a memory 715 including an HS output buffer.

In one embodiment, the backend processing 1406 includes memory 1407 for storing the primitive list for post-tessellated DS/GS intermediate results, the IA 1408, tessellator 710, re-batch processor 1409, DS 650, GS 660, CV 714, further (backend) processing 1409 and the tile buffer 330. The dynamically optimized TBDR pipeline 1400 is similar to the dynamically optimized TBDR pipeline 1300 except that the frontend processing 1405 passes visibility information about post-tessellated primitives to the backend processing 1406. The backend processing 1406 re-tessellates whole patches, but does not process invisible primitives in the patches.

Figure 15:
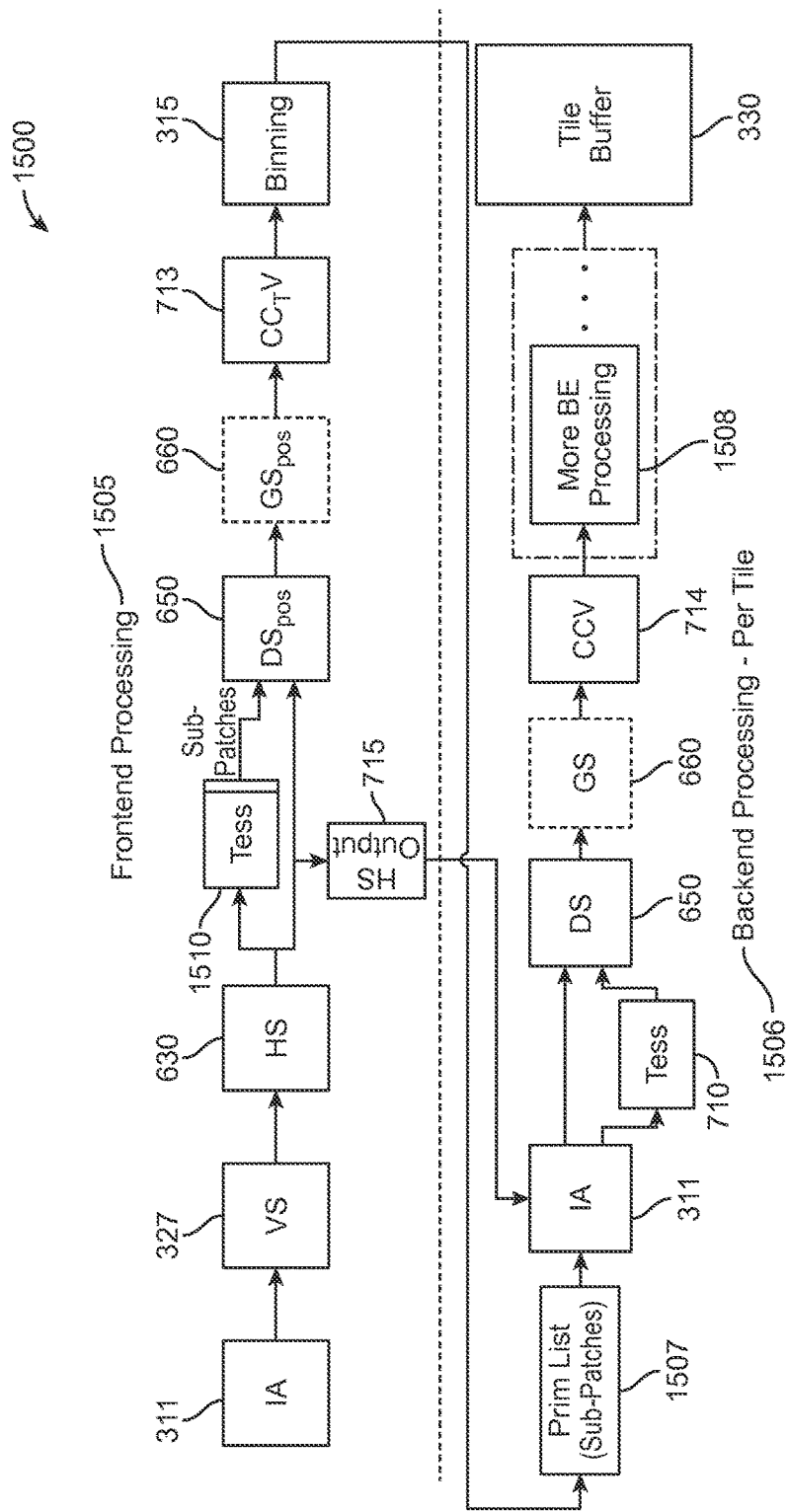
FIG. 15 shows still another example of a TBDR pipeline with tessellation in the frontend and backend processing that may be employed, according to an embodiment.

FIG. 15 shows still another example of a TBDR pipeline 1500 with tessellation in the frontend processing 1505 and backend processing 1506 that may be employed, according to an embodiment. In one embodiment, the frontend processing 1505 includes the IA 311, VS 327, HS 630, tessellator 1510 (outputs sub-patches), $DS_{POS}$ 650, $GS_{POS}$ 660, $CC_TV$ 713, and the binning unit 315. In one embodiment, the frontend processing 1505 includes a memory 715 including an HS output buffer.

In one embodiment, the backend processing 1506 includes memory 1507 for storing the primitive list for tessellated sub-patches intermediate results, the IA 311, tessellator 710, DS 650, GS 660, CCV 714, further (backend) processing 1508 and the tile buffer 330. The dynamically optimized TBDR pipeline 1500 similar to the dynamically optimized TBDR pipeline 1300 (FIG. 13) except that the tessellator 1510 partitions patches into sub-patches and the frontend processing 1505 passes visibility of sub-patches to the backend processing 1506. The backend processing 1506 re-tessellates visible sub-patches, and all tessellated primitives are processed.

Figure 16:
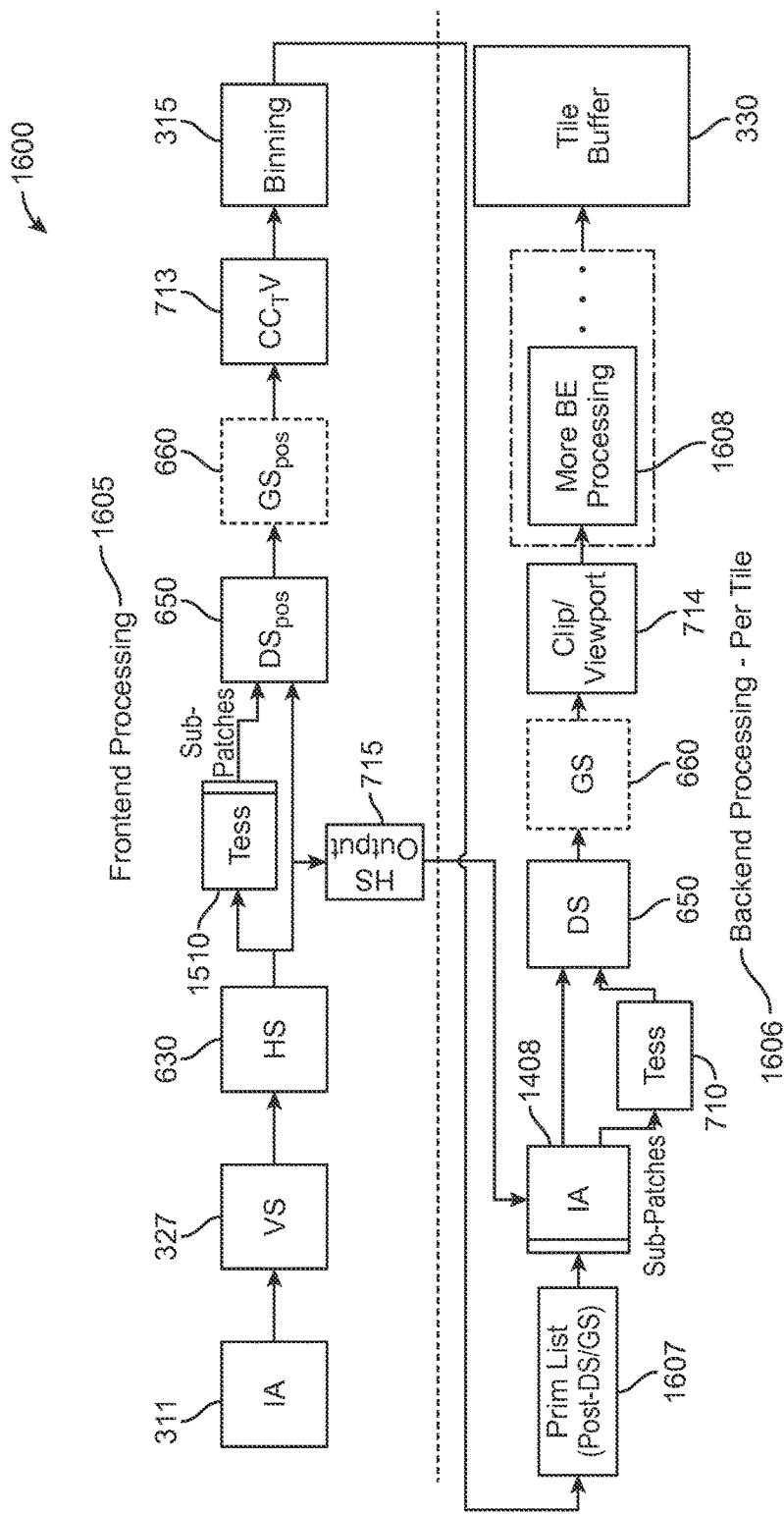
FIG. 16 shows still yet another example of a TBDR pipeline with tessellation in the frontend and backend processing that may be employed, according to an embodiment.

FIG. 16 shows still yet another example of a TBDR pipeline 1600 with tessellation in the frontend processing 1605 and backend processing 1606 that may be employed, according to an embodiment. In one embodiment, the frontend processing 1605 includes the IA 311, VS 327, HS 630, tessellator 1510 (outputs sub-patches), $DS_{POS}$ 650, $GS_{POS}$ 660, $CC_TV$ 713, and the binning unit 315. In one embodiment, the frontend processing 1505 includes a memory 715 including an HS output buffer.

In one embodiment, the backend processing 1606 includes memory 1607 for storing the primitive list for post-tessellated DS/GS intermediate results, the IA 1408 (that outputs patches), tessellator 710, DS 650, GS 660, CCV 714, further (backend) processing 1608 and the tile buffer 330. The dynamically optimized TBDR pipeline 1600 combines functionality of the dynamically optimized TBDR pipeline 1400 (FIG. 14) and 1500 (FIG. 15). The frontend processing 1605 passes visibility information of post-tessellated primitives to the backend processing 1606. The tessellator 710 partitions patches into sub-patches. Only the backend processing 1606 tessellates sub-patches containing visible primitives. The backend processing 1606 only processes visible primitives.

Figure 17:
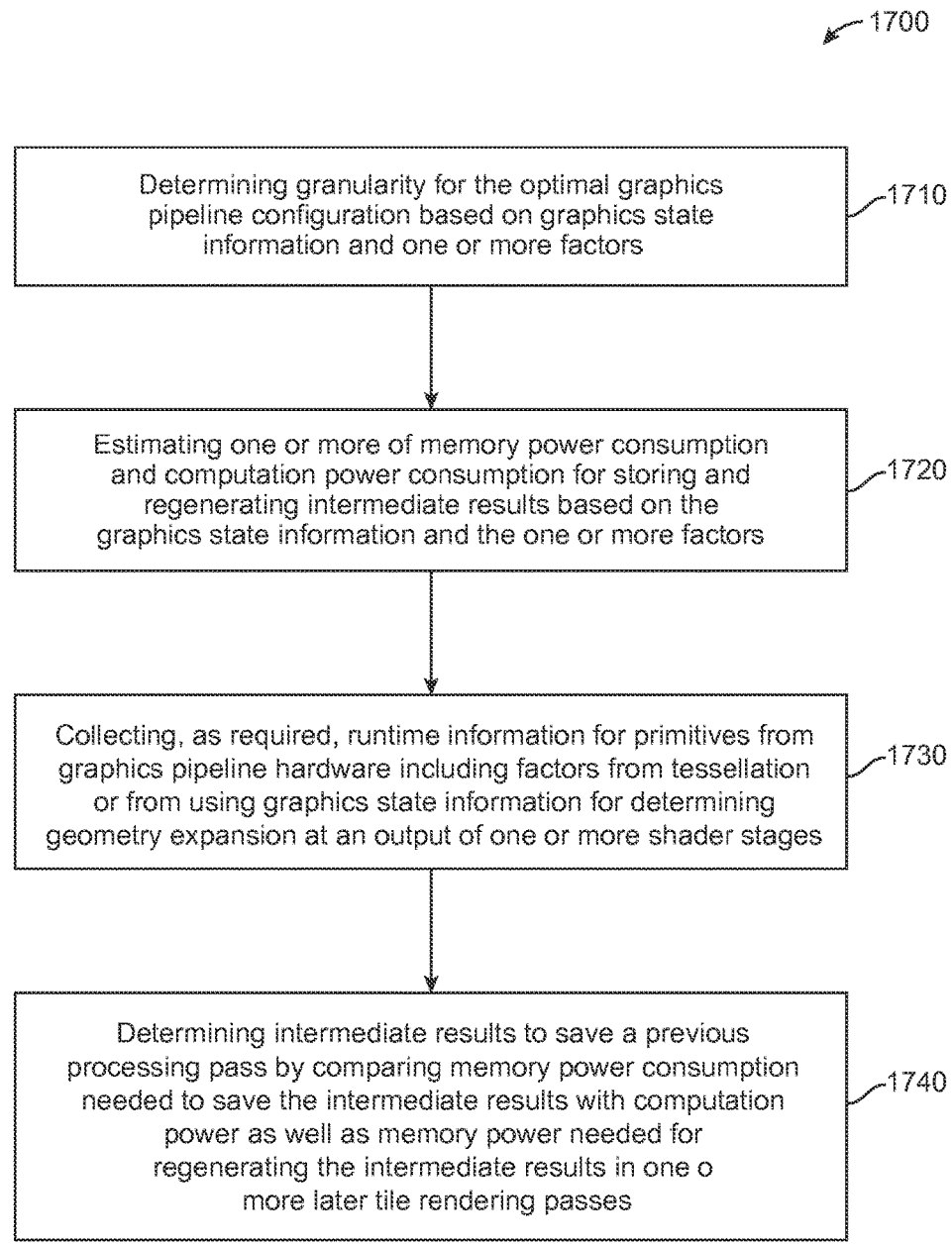
FIG. 17 shows a block diagram for a process for dynamically configuring a graphics pipeline system, according to an embodiment.

FIG. 17 shows a block diagram for a process 1700 for dynamically configuring a graphics pipeline system, according to one embodiment. In one embodiment, in block 1710 process 1700 provides for determining granularity for the optimal graphics pipeline configuration based on graphics state information and one or more factors.

In block 1720, process 1700 provides for determining an optimal pipeline configuration during a processing pass (e.g., a frontend processing phase or pass, a binning phase or pass, etc.) of the graphics pipeline based on estimating one or more of memory power consumption and computation power consumption for storing and regenerating intermediate results based on graphics state information and one or more factors. In one embodiment, the determination of the optimal configuration may not occur during the initial pass of the graphics pipeline. In some embodiments, it may be determined by the driver software purely based on the graphics state information, before the hardware graphics pipeline starts to render the input work stream. In one embodiment, the estimation may include a relative estimation rather than absolute estimation. For example, storing intermediate results requires A memory transactions and B computation operations, whereas regenerating the results requires A' memory transactions and B' computation operations. Then by comparing A+kB and A'+kB', where k is a constant, it may be determined which action is better without the need to estimate exactly how much the consumption is.

In block 1730, process 1700 collects runtime information for primitives from pipeline hardware including factors from tessellation or using graphics state information for determining geometry expansion at an output of one or more shader stages. In block 1740 process 1700 determines intermediate results to save from a previous processing pass by comparing memory power consumption to save the intermediate results with computation power as well as memory power needed for regenerating the intermediate results in one or more later tile rendering passes.

In one embodiment, process 1700 may further include that determined intermediate results are provided to one or more subsequent tile rendering processing passes. The one or more of computation power and memory power needed for regenerating the intermediate results may include power consumption necessary for regenerating the intermediate results for the one or more tile rendering passes.

In one embodiment, in process 1700 a ratio based on collected runtime information and the graphics state information may be determined based on comparing the memory power consumption to save the intermediate results with the computation power needed for regenerating the intermediate results.

In one embodiment, in process 1700 the one or more factors may include one or more of: vertex or primitive attribute count, shader characteristics, power profile coefficients for memory transactions or shader computations. Process 1700 may further include that determining the granularity for the optimal pipeline configuration includes determining the granularity for the optimal pipeline configuration on one or more of the following: a per-primitive basis, a per-draw call basis, and a per-frame basis.

Process 1700 may provide that the factors from tessellation comprise tessfactors, and the output comprises hull shader output. The intermediate results in process 1700 may include one or more of the following: shader outputs at particular shader stages, and post-transformed CCV transform attribute data. Process 1700 may additionally include storing each of the saved intermediate results in memory buffers dedicated to each source of the saved intermediate results.

Process 1700 may further include providing information that indicates each particular memory buffer that the saved intermediate results will be retrieved from based on matching granularity for a current configuration of the graphics pipeline system. Process 1700 may additionally include using the stored intermediate results for bypassing computations during the one or more tile rendering passes. In one example, bypassing computations includes: obtaining the intermediate results from one or more corresponding particular memory buffers; bypassing computations in one or more appropriate graphics pipeline stages to avoid regenerating the intermediate results fetched from the corresponding particular memory buffers; and using the obtained intermediate results at the one or more appropriate graphics pipeline stages during the one or more tile rendering passes. In one embodiment, the graphics pipeline system in process 1700 may be used by a mobile electronic device (e.g., electronic device 120, FIG. 2).

Figure 18:
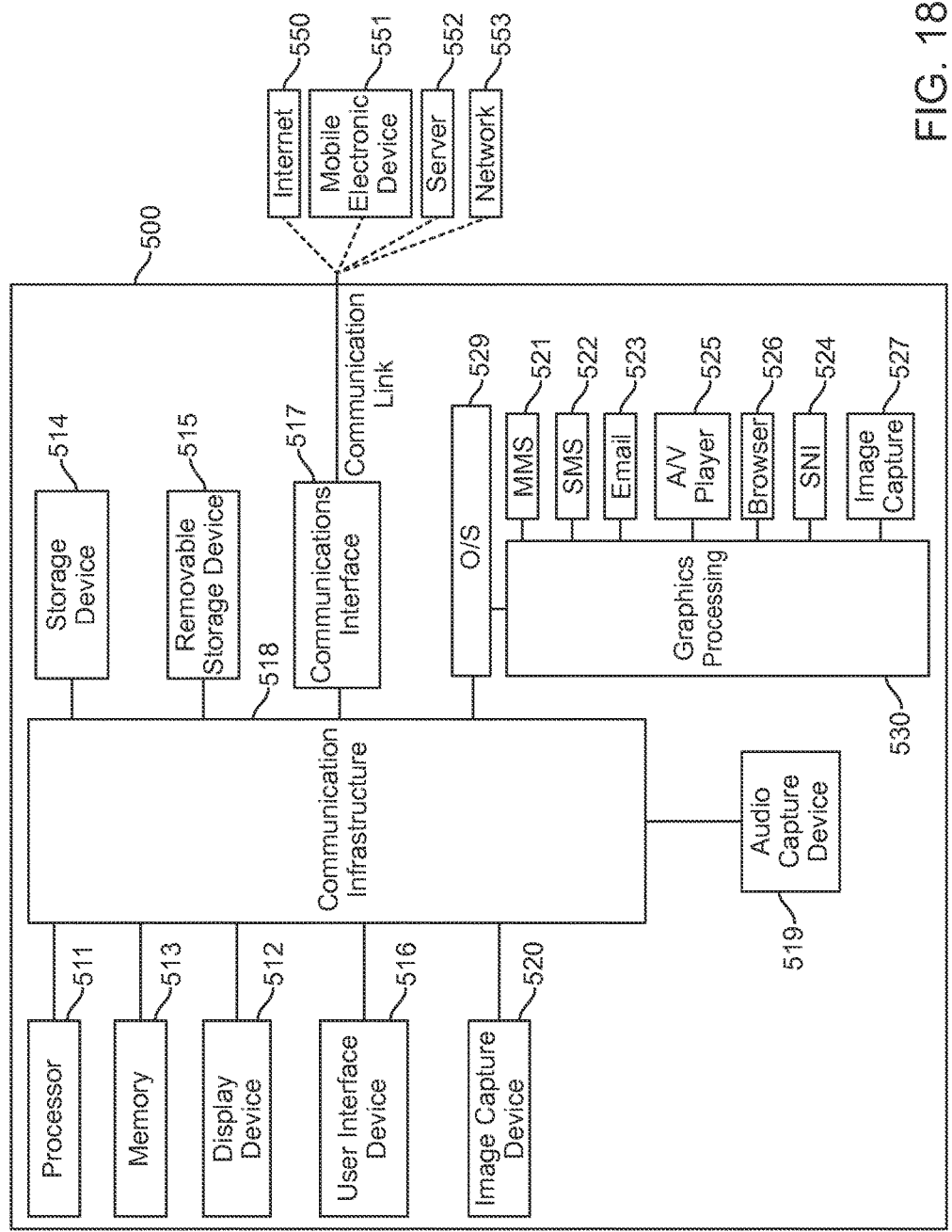
FIG. 18 is a high-level block diagram showing an information processing system comprising a computing system implementing one or more embodiments.

FIG. 18 is a high-level block diagram showing an information processing system comprising a computing system 500 implementing one or more embodiments. The system 500 includes one or more processors 511 (e.g., ASIC, CPU, etc.), and may further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, fabric, cross-bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, tablet, wearable device, etc.), the system 500 further includes an image capture device 520, such as a camera 128 (FIG. 2), and an audio capture device 519, such as a microphone 122 (FIG. 2). The system 500 may further include application modules as MMS interface 521, SMS interface 522, email interface 523, social network interface (SNI) interface 524, audio/video (AV) player 525, web browser 526, image capture interface 527, etc.

In one embodiment, the system 500 includes a graphics processing interface 530 that may implement processing similar as described regarding data flow 600 (FIG. 6), and graphics pipeline processing 400 (FIG. 5), 700 (FIG. 7), 800 (FIG. 8), 900 (FIG. 9), 1000 (FIG. 10), 1100 (FIG. 11), 1200 (FIG. 12), 1300 (FIG. 13), 1400 (FIG. 14), 1500 (FIG. 15) and 1600 (FIG. 16). In one embodiment, the graphics processing interface 530 may implement the process of flowchart 1700 (FIG. 17). In one embodiment, the graphics processing interface 530 along with an operating system 529 may be implemented as executable code residing in a memory of the system 500. In another embodiment, the graphics processing interface 530 may be provided in hardware, firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software interface or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, solid state drive (SSD), etc. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for dynamically configuring a graphics pipeline system comprising:
   determining an optimal graphics pipeline configuration based on:
   determining granularity for the optimal graphics pipeline configuration based on graphics state information and one or more factors;
   estimating one or more of memory power consumption and computation power consumption for storing and regenerating intermediate results based on the graphics state information and the one or more factors;
   collecting, as required, runtime information for primitives from graphics pipeline hardware including factors from tessellation or from using graphics state information for determining geometry expansion at an output of one or more shader stages;
   comparing memory power consumption needed to save intermediate results of a previous binning processing pass with computation power as well as memory power needed for regenerating the intermediate results in one or more later tile rendering passes; and
   determining which of the intermediate results to save from the previous binning processing pass based on results of the comparison.

2. The method of claim 1, wherein:
   determined intermediate results are provided to one or more subsequent tile rendering processing passes; and
   the one or more of computation power and memory power needed for regenerating the intermediate results comprises power consumption necessary for regenerating the intermediate results for the one or more tile rendering passes.

3. The method of claim 2, wherein a ratio based on collected runtime information and the graphics state information is determined based on comparing the memory power consumption to save the intermediate results with the computation power needed for regenerating the intermediate results.

4. The method of claim 1, wherein the one or more factors comprise: vertex or primitive attribute count, shader characteristics, power profile coefficients for memory transactions or shader computations.

5. The method of claim 1, wherein determining the granularity for the optimal graphics pipeline configuration comprises determining the granularity for the optimal graphics pipeline configuration on one or more of: a per-primitive basis, a per-draw call basis, and a per-frame basis.

6. The method of claim 1, wherein the factors from tessellation comprise tessfactors, and the output comprises hull shader output.

7. The method of claim 2, wherein the intermediate results comprise one or more of: shader outputs at particular shader stages, and post-transformed cull, clip, and viewport (CCV) transform attribute data.

8. The method of claim 2, further comprising:
   storing each saved intermediate results in memory buffers dedicated to each source of the saved intermediate results.

9. The method of claim 8, further comprising:
   providing information that indicates each particular memory buffer that the saved intermediate results will be retrieved from based on matching granularity for a current configuration of the graphics pipeline system.

10. The method of claim 9, further comprising:
    using the stored intermediate results for bypassing computations during the one or more tile rendering passes.

11. The method of claim 10, wherein bypassing computations comprises:
    obtaining the intermediate results from one or more corresponding particular memory buffers;
    bypassing computations in one or more appropriate graphics pipeline stages to avoid regenerating the intermediate results fetched from the corresponding particular memory buffers; and
    using the obtained intermediate results at the one or more appropriate graphics pipeline stages during the one or more tile rendering passes.

12. The method of claim 1, wherein the graphics pipeline system is used by a mobile electronic device.

13. A non-transitory processor-readable medium that includes a program that when executed on a processor performs a method comprising:
    determining an optimal graphics pipeline configuration based on: determining granularity for the optimal graphics pipeline configuration based on graphics state information and one or more factors;
    estimating one or more of memory power consumption and computation power consumption of storing and regenerating intermediate results based on the graphics state information and the one or more factors;
    collecting, as required, runtime information for primitives from graphics pipeline hardware including factors from tessellation or from using graphics state information for determining geometry expansion at an output of one or more shader stages;
    comparing memory power consumption needed to save intermediate results of a previous binning processing pass with computation power as well as memory power for regenerating the intermediate results in one or more later tile rendering passes; and
    determining which of the intermediate results to save from the previous binning processing pass based on results of the comparison.

14. The non-transitory processor-readable medium of claim 13, wherein:
    determined intermediate results are provided to one or more subsequent tile rendering processing passes.

15. The non-transitory processor-readable medium of claim 13, wherein the one or more of computation power and memory power needed for regenerating the intermediate results comprises power consumption necessary for regenerating the intermediate results for the one or more tile rendering passes.

16. The non-transitory processor-readable medium of claim 14, wherein:
a ratio based on collected runtime information and the graphics state information is determined based on comparing the memory power consumption to save the intermediate results with the computation power needed for regenerating the intermediate results.

17. The non-transitory processor-readable medium of claim 13, wherein the one or more factors comprise: vertex or primitive attribute count, shader characteristics, power profile coefficients for memory transactions or shader computations.

18. The non-transitory processor-readable medium of claim 13, wherein the factors from tessellation comprise tessfactors, the output comprises hull shader output, and the intermediate results comprise one or more of: shader outputs at particular shader stages, and post-transformed cull, clip, and viewport (CCV) transform attribute data.

19. The non-transitory processor-readable medium of claim 14, further comprising:
storing each saved intermediate results in memory buffers dedicated to each source of the saved intermediate results;
providing information that indicates each particular memory buffer that the saved intermediate results will be retrieved from based on matching granularity for a current configuration of the graphics pipeline; and
using the stored intermediate results for bypassing computations during the one or more tile rendering passes.

20. The non-transitory processor-readable medium of claim 19, wherein bypassing computations comprises:
obtaining the intermediate results from one or more corresponding particular memory buffers;
bypassing computations in one or more appropriate graphics pipeline stages to avoid regenerating the intermediate results fetched from the corresponding particular memory buffers; and
using the obtained intermediate results at the one or more appropriate graphics pipeline stages during the one or more tile rendering passes.

21. The non-transitory processor-readable medium of claim 13, wherein the graphics pipeline is used by a mobile electronic device.

22. A graphics processing system comprising:
a graphics processing unit (GPU) including a graphics processing pipeline, the GPU dynamically determines an optimal graphics processing pipeline configuration during a processing pass, wherein the GPU is configured to:
determine granularity for the optimal graphics processing pipeline configuration based on graphics state information and one or more factors;
estimate one or more of memory power consumption and computation power consumption of storing and regenerating intermediate processing results based on the graphics state information and the one or more factors;
collect, as required, runtime information for primitives from graphics processing pipeline hardware including factors from tessellation or from using graphics state information for determining geometry expansion at an output of one or more shader stages;
comparing memory power consumption needed to save intermediate processing results of a previous binning processing pass with computation power as well as memory power needed for regenerating the intermediate processing results in one or more later tile rendering passes; and
determine which of the intermediate processing results to store from the previous binning processing pass based on results of the comparison.

23. The graphics processing system of claim 22, wherein:
the GPU is further configured to provide the intermediate processing results to one or more subsequent tile rendering processing passes; and
the one or more of computation power and memory power needed for regenerating the intermediate processing results comprises power consumption necessary for regenerating the intermediate processing results for the one or more tile rendering passes.

24. The graphics processing system of claim 23, wherein:
a ratio based on collected runtime information and the graphics state information is determined by the GPU based on comparing the memory power consumption to store the intermediate processing results with the computation power needed for regenerating the intermediate processing results.

25. The graphics processing system of claim 22, wherein the one or more factors comprise: vertex or primitive attribute count, shader characteristics, power profile coefficients for memory transactions or shader computations.

26. The graphics processing system of claim 22, wherein the factors from tessellation comprise tessfactors, the output comprises hull shader output, and the intermediate processing results comprise one or more of: shader outputs at particular shader stages, and post-transformed cull, clip, and viewport (CCV) transform attribute data.

27. The graphics processing system of claim 22, wherein the GPU is further configured to:
store the intermediate processing results in memory buffers dedicated to each source of the intermediate processing results;
provide information that indicates each particular memory buffer that the stored intermediate processing results will be retrieved from based on matching granularity for a current configuration of the graphics processing pipeline; and
use the stored intermediate processing results for bypassing computations during the one or more tile rendering passes.

28. The graphics processing system of claim 27, wherein the GPU is further configured to:
obtain the intermediate processing results from one or more corresponding particular memory buffers;
bypass computations in one or more appropriate graphics processing pipeline stages to avoid regenerating the intermediate processing results fetched from the corresponding particular memory buffers; and
use the obtained intermediate results at the one or more appropriate graphics pipeline stages during the one or more tile rendering passes.

29. The graphics processing system of claim 22, wherein the GPU is used by a mobile electronic device.

30. The graphics processing system of claim 29, wherein the mobile electronic device comprises one or more of a mobile telephone, a tablet device, a wearable device and a mobile computing device.

* * * * *